(12) United States Patent  (10) Patent No.: US 7,720,074 B2
Chewning, III et al.  (45) Date of Patent: May 18, 2010

(54) METHODS AND SYSTEMS OF NETWORK MANAGEMENT

(75) Inventors: Ward M. Chewning, III, Lawrenceville, GA (US); Fariborz Behi, Dunwoody, GA (US); Martin Alan Cooper, Dunwoody, GA (US)

(73) Assignee: AT&T Intellectual Property I, L.P., Norcross, GA (US)

( * ) Notice: Subject to any disclaimer, the term of this patent is extended or adjusted under 35 U.S.C. 154(b) by 547 days.

(21) Appl. No.: 11/564,095

(22) Filed: Nov. 28, 2006

(65) Prior Publication Data

US 2007/0097884 A1 May 3, 2007

Related U.S. Application Data

(63) Continuation of application No. 09/649,478, filed on Aug. 2, 2000, now Pat. No. 7,142,530.

(60) Provisional application No. 60/151,120, filed on Aug. 27, 1999.

(51) Int. Cl.
*H04L 12/28* (2006.01)
*G06F 15/173* (2006.01)

(52) U.S. Cl. .............. 370/395.21; 370/237; 370/254; 370/395.3; 709/223; 709/220; 709/238

(58) Field of Classification Search .............. None
See application file for complete search history.

(56) References Cited

U.S. PATENT DOCUMENTS

| | | | | |
|---|---|---|---|---|
| 5,490,141 | A * | 2/1996 | Lai et al. | 370/352 |
| 6,055,239 | A * | 4/2000 | Kato | 370/409 |
| 6,105,065 | A * | 8/2000 | Rao et al. | 709/224 |
| 6,226,263 | B1 * | 5/2001 | Iwase et al. | 370/231 |
| 6,480,487 | B1 | 11/2002 | Wegleitner et al. | |
| 6,636,505 | B1 * | 10/2003 | Wang et al. | 370/352 |
| 2005/0216421 | A1 * | 9/2005 | Barry et al. | 705/64 |
| 2006/0274735 | A1 * | 12/2006 | Allen et al. | 370/356 |

OTHER PUBLICATIONS

Chewning; U.S. Appl. No. 09/649,478, filed Aug. 28, 2000.
Chewning; Non-Final Rejection mailed Dec. 5, 2003; U.S. Appl. No 09/649,478, filed Aug. 28, 2000.
Chewning; Non-Final Rejection mailed Jun. 22, 2004; U.S. Appl. No. 09/649,478, filed Aug. 28, 2000.

(Continued)

*Primary Examiner*—Ricky Ngo
*Assistant Examiner*—Clemence Han
(74) *Attorney, Agent, or Firm*—Hope Baldauff Hartman LLC

(57) ABSTRACT

A network management system (NMS) automatically models a path for a customer's services from a terminating unit through elements typically on a link-by-link basis, across networks if appropriate, to a network service provider (NSP) or Internet service provider (ISP). The path may be a private virtual circuit or connection (PVC), and it may traverse an "overall network" including other networks such as an asymmetric digital subscriber line (ADSL) service or sub-networks. To model a path, the NMS creates a topology including the elements and links in the overall network and respective features, functions, characteristics, and capacities thereof. The topology allows the NMS to speedily, efficiently, and automatically provision a customer's service from the terminating unit to connection to the customer's selected NSP or ISP for Internet access.

18 Claims, 33 Drawing Sheets

OTHER PUBLICATIONS

Chewning; Examiner Interview Summary Record mailed Sep. 8, 2004; U.S. Appl. No. 09/649,478, filed Aug. 28, 2000.
Chewning; Non- Final Rejection mailed Apr. 19, 2005; U.S. Appl. No. 09/649,478, filed Aug. 28, 2000.
Chewning; Examiner Interview Summary Record mailed May 17, 2005; U.S. Appl. No. 09/649,478, filed Aug. 28, 2000.
Chewning; Final Rejection mailed Oct. 17, 2005; U.S. Appl. No. 09/649,478, filed Aug. 28, 2000.
Chewning; Examiner Interview Summary Record mailed Nov. 10, 2005; U.S. Appl. No. 09/649,478, filed Aug. 28, 2000.
Chewning; Notice of Allowance and Fees Due mailed Jan. 11, 2006; U.S. Appl. No. 09/649,478, filed Aug. 28, 2000.

* cited by examiner

Alert Display Window: 1 — 244

Display  Alert Management  Trouble Ticket  Device Mgmt

Sort: Severity - Oldest Create time First    Include Filter:
Column Det: NetExpert Default    Exclude Filter:

| AMO | Description | Count | Create Time TT | Operator | Class | Create Date | Manager |
|---|---|---|---|---|---|---|---|
| ServiceOrderInf | SOCS gateway is not responding | 145: | 16:20:03 | | SOCS | 07/09/98 | Serviced |
| STMNGAMN001 prov | AdslPort CLWGGAMNH01-1-1-6-4 C | 20: | 11:31:33 | | AwsProv | 06/30/98 | STMNGAMN |
| hnm | Atmjc3Port STMNGAMNATI-1-1-5-3 | 1 | 10:56:38 | | NMSOperator | 06/30/98 | appLayer |

Total Available and Assigned ADSL Ports - DSLAM

DSLAM CLLI: ROSLGAMNH01

DSLAM
- Total Available ADSL Ports: 24
- Cross-connected ADSL Ports: 0
- Port Availability Threshold: 22

Subnetwork
- Subnetwork % Utilization: 66
- Subnetwork % Utilization Threshold: 90

Subtending MiniRams:

| Name | PercentUtilization | TshPercentUtilization |
|---|---|---|
| SNVLGAMNH01 | 0 | 90 |
| RIVVGAMNH01 | 37 | 90 |
| SNVLGAMNH01 | 0 | 90 |
| RIVVGAMNH01 | 37 | 90 |
| SNVLGAMNH01 | 0 | 90 |

[OK] [Close]

Done Getting Capacity

*Fig. 5B*

Capacity Management - DSLAM Thresholds

CLLI: [ ]   [Retrieve]

Saturation Threshold: [   ] % 0 - To use Defaults

Saturation Threshold Alarm Inhibited: [ ] 0 - Enabled   1 - Inhibited

Available Port Threshold: [   ]   0 - To use Defaults

Available Ports Alarm Inhibited: [ ] 0 - Enabled   1 - Inhibited

[OK]   [Close]

Capacity Management - MiniRam Thresholds

CLLI: [ ]   [Retrieve]

Saturation Threshold: [   ] % 0 - To use Defaults

Saturation Threshold Alarm Inhibited: [ ] 0 - Enabled   1 - Inhibited

[OK]   [Close]

DSLAM/MiniRam Port Inventory

CLLI: RIVVGAMNH01

| Type | Cosmos/LFACS | Assigned Status | Denied | Subtending |
|---|---|---|---|---|
| RIVVGAMNH01-1-1-1-1 | ADSL | ************** | N | OOS-AU |
| RIVVGAMNH01-1-1-1-2 | ADSL | ************** | N | OOS-AU |
| RIVVGAMNH01-1-1-1-3 | ADSL | ************** | N | OOS-AU |
| RIVVGAMNH01-1-1-1-4 | ADSL | ************** | N | OOS-AU |
| RIVVGAMNH01-1-1-1-1 | ADSL | ************** | N | OOS-AUMA |
| RIVVGAMNH01-1-1-1-2 | ADSL | ************** | N | OOS-AUMA |
| RIVVGAMNH01-1-1-1-3 | ADSL | ************** | N | OOS-AUMA |
| RIVVGAMNH01-1-1-1-4 | ADSL | ************** | N | OOS-AUMA |

[ OK ]  [ Close ]

Completed Getting MiniRam Inventory

*Fig. 5G*

DSLAM/MiniRam Port Inventory

CLLI: RIVVGAMNH01

| Card | Type | SW Version | Vendor | Serial # | Status |
|---|---|---|---|---|---|
| RIVVGAMNH01-1-1-1 | ADLT-E | HH3CAA.314 | ALCL | 983325106 | IS-NR |
| RIVVGAMNH01-1-1-2 | ADLT-E | HH3CAA.314 | ALCL | 983409651 | IS-NR |

[ OK ]  [ Close ]

Completed Getting MiniRam Inventory

*Fig. 5H*

Add Bulk PVC

Old ATM Port Info

Old NSP CID:

New ATM Port Info.

CLLI:

Rack: 1

Shelf: 1

Slot:

Port:

Optional Date and Time

Due Date:    Time:

[OK]    [Close]

*Fig. 6A*

Edit Bulk PVC: NO1CID-0-0-0

Old ATM Port Info.

Old NSP CID: NO1CID

New ATM Port Info.

CELLI: STMNGAMNAT1

Rack: 1

Shelf: 1

Slot: 5

Port: 7

Optional Date and Time

Due Date: ...  Time: ...

[ OK ]  [ Close ]

Done Retrieving <NO1CID-0-0-0> Bulk PVC Order I

Edit Service Order Detail

Editable Data

| | |
|---|---|
| Atur VPI: | 8 |
| AturVCI: | 35 |

| | |
|---|---|
| COSMOS/LFACS: | COSMOS |
| COSMOS/LFACS pORT: | DPG1-1 |
| Exchange Key/CLLI: | RIVVGAMNH01 |

| | |
|---|---|
| NSP CIT: | )HCFJ123456_SC |
| NSP VPI: | 2 |
| NSP VCI: | 201 |

Change USOC: ADL11

Display Only Data

ADSL Port: UNKNOWN    COSMOS/LFACS: LFACS
USOC: ADL12

[ OK ]   [ Close ]

METHODS AND SYSTEMS OF NETWORK MANAGEMENT

RELATED APPLICATIONS

This application is a continuation of U.S. patent application Ser. No. 09/649,478 filed Aug. 28, 2000, now U.S. Pat. No. 7,142,530, which claims the benefit of U.S. Provisional Patent Application Ser. No. 60/151,120, filed Aug. 27, 1999, both of which are entirely incorporated herein by reference.

FIELD OF THE INVENTION

The inventions described herein relate to the field of telecommunications, and particularly, relate to the provisioning and management of digital subscriber line (DSL) services such as asymmetric digital subscriber line (ADSL) services.

BACKGROUND

Fast access to the Internet. Many products and services advertise fast access to the Internet, and many deliver fast access, but only after the customer has been provisioned and otherwise set-up to receive and connect to the services for appropriate interface with the Internet. The actual "provisioning" and related operations to get the customer set-up for Internet access may be anything but fast access. In fact, setting up a customer for connection to the Internet is often done manually and piecemeal, which is rather ironic given the technology being provisioned. This manual and piecemeal provisioning generally includes an element-by-element review and execution across the various networks by the appropriate service representatives. For example, a customer subscribing to ADSL service must be provisioned with the ADSL service by the ADSL service provider. The customer then is connected typically through an asynchronous transfer mode (ATM) switch and an Internet service provider (ISP) or network service provider (NSP) for ultimate access to the Internet (or other global communications network). For each element in the network(s) necessary to connect the customer to the Internet, appropriate service representatives typically check such facts as whether the element has the capacity to serve the customer's needs, whether the element is connected appropriately to other elements necessary to the service, whether the element may properly interface with the other necessary elements, etc.

Why is the provisioning of a customer's service often done manually and piecemeal? Because there generally has been no other way to accomplish connection of a customer to across networks or cross domains to the Internet. An example best demonstrates this manual and piecemeal provisioning. A first service representative doing the provisioning for the customer's ADSL service plots a path for the customer's communications from a beginning at the customer's terminating unit (TU) through elements across the ADSL network to the point where the path crosses over to another network or domain. At that cross-over point, another service representative takes over from the first representative and continues plotting the path through his or her "territory". This hand-off of the path plotting continues until the path is completed to an end at the ISP or NSP providing the ultimate connection to the Internet.

The plotting of the path from the customer's TU to the end connection to the NSP or ISP is further complicated by the path consisting of a permanent virtual circuit (PVC) (also referred to as a permanent virtual connection). Each link between elements in the path from the customer's terminating unit to the NSP must first be determined, cleared and/or configured, if necessary, and otherwise set up to service the customer as part of the PVC. Each link in the path may differ from the other links as a result of the type, placement, use or other feature of the respective elements that are linked in the path. For example, a link may connect elements from two different vendors. Further, the determination of a path for the customer's service is complicated by the traversal of the path across more than one type of network. The disparate networks add to the complications in determining a path because the networks may operate in respective protocols, or otherwise differ from each other so as to make determination of the path across the networks difficult.

Thus, the provisioning of the customer's connection to the Internet requires appropriate service representative(s) to determine the segments making up a path for the customer's service by proper element-by-element linking from the customer's terminating unit to the NSP serving the customer. This element-by-element linking may be confusing or at least complicated, and therefore, is time-consuming and slows down the customer's access to the Internet or other global communications network.

Accordingly, there is a need for methods and systems that allow for the efficient, cost-effective, and speedy provisioning of a customer for services such as DSL service and the like, that connect the customer to the Internet or other global communications network.

SUMMARY

Generally, the methods and systems described herein provide a network management system (NMS) that can automatically model a path for a customer's services from the customer's terminating unit (TU) through elements typically on a link-by-link basis, across networks if appropriate, t a network service provider (NSP) or Internet service provider (ISP). The path may be referred to as a permanent virtual circuit or permanent virtual connection (PVC), and it may traverse an "overall network" including other networks such as an asymmetric digital subscriber line (ADL) service or sub-networks. To model a path for a customer's services, the NMS creates a topology or overall model including the elements and links in the overall network and respective features, functions, characteristics, and capacities thereof.

Advantageously, the creation of a topology or overall model of the overall network allows the NMS to speedily, efficiently, and automatically provision a customer's service from the customer terminating unit to connection to the customer's selected NSP for Internet access. In addition, the creation of the topology allows the NMS to implement functions other than the modeling of a path for a customer's services. For example, the NMS may include fault management functions, diagnostic functions, capacity and inventory management functions, and service management functions related to the elements, links, networks, and sub-networks of the overall network.

Further, the creation of the topology or overall model network allows for the automation of many of the previously mentioned actions so that many customers may be quickly and efficiently provisioned with services or other actions taken on a larger scale and more efficient than previously possible through the manual operations described in the background above.

That the present inventions and the exemplary embodiments accomplish the features of the present inventions will become apparent from the detailed description of the exemplary embodiments and the drawings that follow.

BRIEF DESCRIPTION OF THE DRAWINGS

FIGS. 4A-4H illustrate windows and other screen displays that may appear to or be used by a user of a graphic user interface (GUI) of an exemplary NMS in connection with diagnostic functions or features.

FIGS. 5A-5H illustrate windows and other screen displays that may appear to or be used by a user of a graphic user interface of an exemplary NMS in connection with capacity and inventory management functions and features.

FIGS. 6A-6K illustrate windows and other screen displays that may appear to or be used by a user of a graphic user interface (GUI) of an exemplary NMS in connection with service management features or functions.

DETAILED DESCRIPTION

The exemplary network management system (NMS) described herein allows for the automatic modeling of a path for a customer's communication services from the customer's terminating unit (TU) through elements and across networks (such as a network including services such as digital subscriber line (DSL) service or asymmetrical digital subscriber line (ADSL) service) to an NSP for access to the Internet or other global communications network. Advantageously, a customer's TU may be a communications device such as telephone, a computer, a modem, a facsimile machine, or the like.

Figure 1:
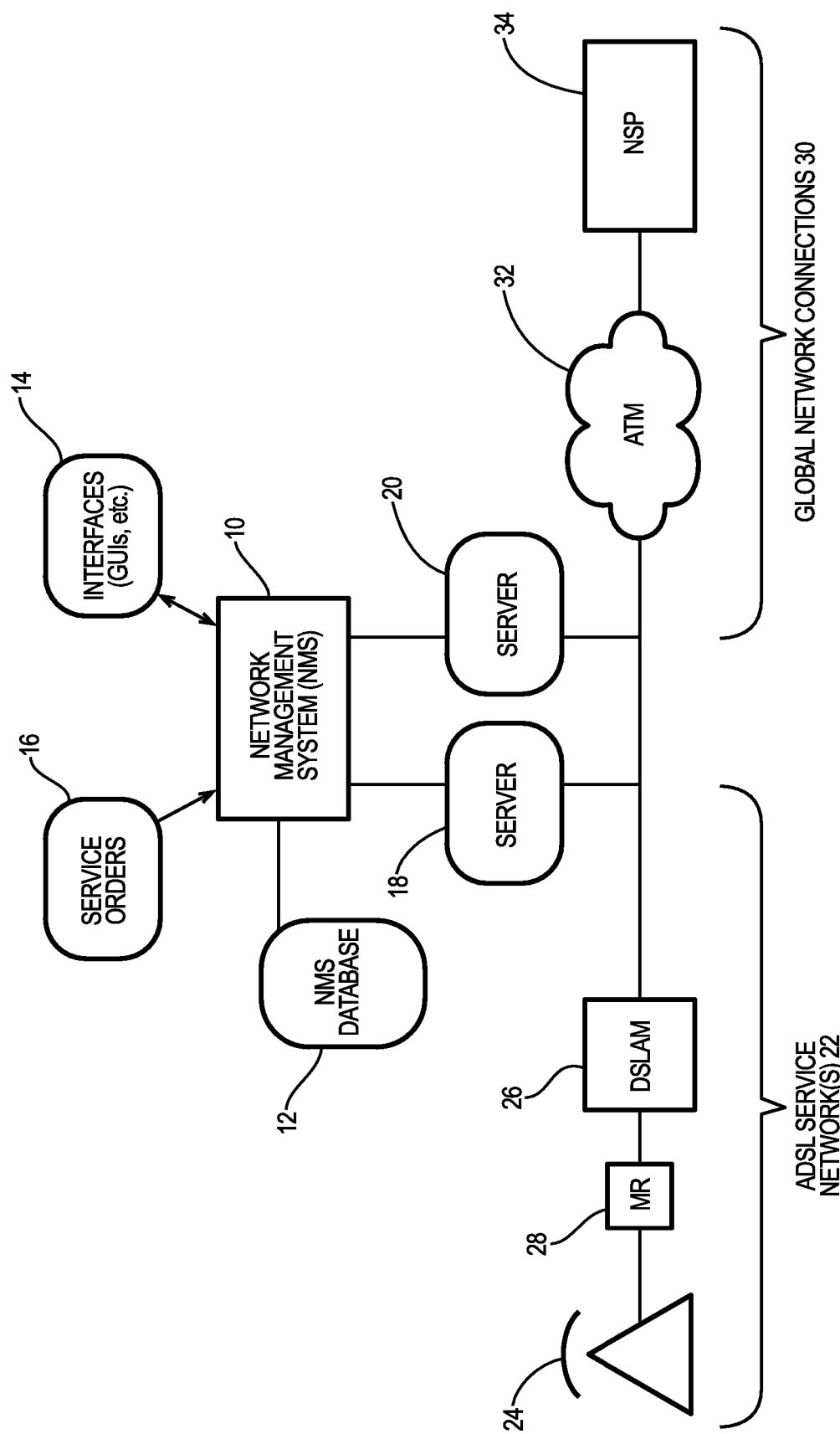
FIG. 1 is a block diagram of an exemplary environment for operation of an exemplary NMS.

FIG. 1 is a block diagram of an exemplary environment for operation of an exemplary NMS 10. The exemplary NMS 10 is implemented in a computer (and its applicable programming) such as an Open Systems Interconnection (OSI) platform that allows for a multiple protocol network management system. The NMS 10 includes an NMS database for use in the storage of information and data related to the NMS functions. Further, the NMS 10 is connected through interfaces 14 to users. For example, a user may access the NMS 10 for one or more of its functionalities (pursuant to the appropriate authorization of the user) through a graphical user interface (GUI) (or other interfaces) accessed directly or indirectly by the user. The GUI presents the user with screen displays, windows, etc. so as to interact with the user by receiving information and instructions from the user, and by providing information and instructions to the user as appropriate for the functionality of the NMS accessed by the user.

As noted, one of the functionalities of the NMS is the provisioning of a path for a customer from the customer's TU through to the NSP selected by the customer for Internet access. Thus, the NMS receives service orders (SOs) for such provisioning (complete or partial provisioning such as through a network providing ADSL services only). The receipt of the service orders is represented in FIG. 1 by the Service Orders block 16 as an input to the NMS 10. In response to receipt of the service orders, the NMS automatically uses the information provided thereby to provision the appropriate paths based on the topology or overall network model created in the NMS for the appropriate overall network.

To aid the NMS 10 in the collection of information and implementation of its functionality, the NMS 10 may interact with one or more servers such as server 18 and server 20. In particular, server 18 may interact with NMS 10 with respect to the network(s) 22 providing communications services such as ADSL service to a customer 24. As illustrated in FIG. 1, the network(s) 22 providing ADSL service to the customer 24 includes a digital subscriber line access multiplexer (DSLAM) 26 and a Mini-Ram (MR) 28 (which may be subtending). Server 18 may interact with the NMS 10 and the network(s) 22 providing the ADSL service by obtaining information about the respective elements of the network(s) 22 and by providing the information to the NMS 10. Further, the server 18 may execute instructions from the NMS 10 with respect to the configuration and implementation of a customer's path through the network(s) 22. An exemplary server 18 is an Alcatel server.

The server 20 may interact with the NMS 10 with respect to the global network connections 30 providing communication services such as data connections/communications to the Internet (not illustrated). As illustrated in FIG. 1, the global network connections 30 providing the data connections/communications to the Internet include an ATM network 32 (and including an ATM switch) and a network service provider (NSP) 34 (which may be an Internet Service Provider (ISP)or other provider). Server 20 may interact with the NMS 10 and the connections 30 by obtaining information about the respective elements of the network 32 and/or the NSP 34 and by providing the information to the NMS 10. Further, the server 20 may execute instructions from the NMS 10 with respect to the configuration and implementation of a customer's path through the network(s) 32 to the NSP 34. An exemplary server 20 is Lucent server.

As noted, the exemplary NMS 10 allows for the automatic modeling of a path for a customer's communication services from the customer's terminating unit (TU) 24 through elements and across networks (such as a network 22 including services such as digital subscriber line (DSL) service or asymmetrical digital subscriber line (ADSL) service) to an NSP 34 for access to the Internet or other global communications network. The modeling is implemented in response typically to a service order from a customer received at the NMS 10. A service order contains information relating to the customer and his or her service. Advantageously, the customer information collected in the service order is sufficient according to the methods and systems described herein for such customer information to be mapped so as to model a path for the customer's services from the user's terminating unit to the NSP.

The modeling of a customer's path is accomplished generally through representation of the elements in the networks included in the overall network from customers' terminating units to the appropriate NSPs. The relationships of each of the elements to the other elements in the overall network are tracked through links between respective elements. A link connects elements, and the connectivity between the respective ports of the linked elements is tracked. This representation and tracking results in a logical model of the physical elements of the overall network.

Exemplary Network Creation in the NMS Database

Figure 2:
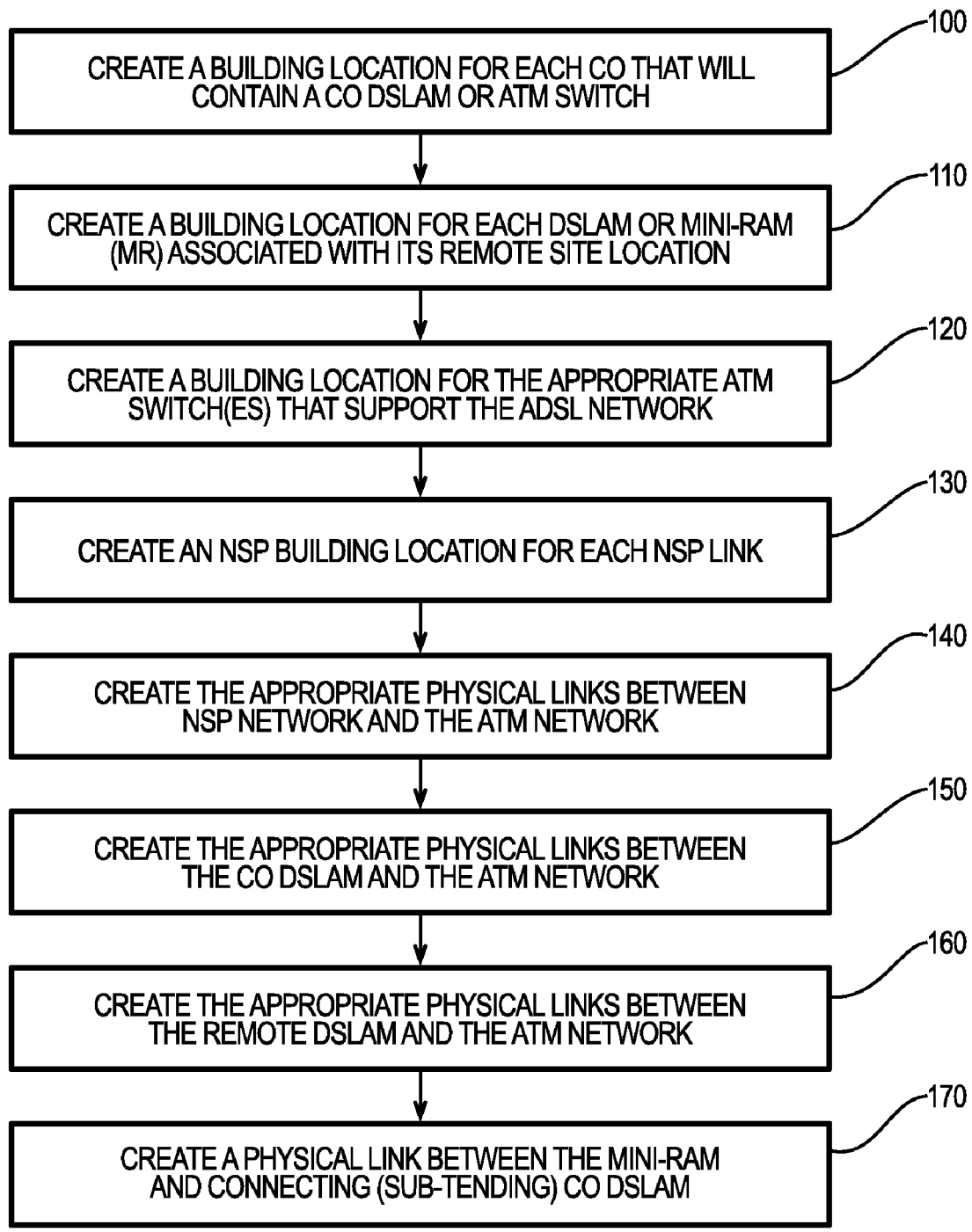
FIG. 2 is a block diagram illustrating an exemplary network creation in the NMS database.

Prior to modeling of a customer's path, the NMS 10 is provisioned with a topology or overall network model of the appropriate overall network. The overall network model is accomplished preferably through the creation of a network in the NMS database 12. FIG. 2 is a block diagram illustrating an exemplary network creation in the NMS database 12. Actions 100-130 include creation of appropriate building locations in the NMS database. The creation of a building location may include supply of the following information: a Common Location Language Identifier (CLLI) including city code, site, and network site; a street address; a state; and a Local Access and Transport Area (LATA) name.

In action 100, a building location is created in the NMS database for each central office (CO) that will contain a CO DSLAM or ATM switch equipment in the overall network. There may be prerequisites for creation of a CO containing a CO DSLAM including: physical installation of the DSLAM in its building location; initialization, timing, and other attributes of the DSLAM must be set; DSLAM must include its source identifier (SID)(which may be a CLLI); and a valid managing server (such as server 18 which may be an Alcatel AWS server) is associated with the DSLAM.

In action 110, a building location is created for each remote DSLAM or Mini-Ram associated with its remote site location. The creation of a building location for a remote site may include the information mentioned above for a building location as well as the following information: remote site CLLI; and the serving CO CLLI. When the building location (sometimes referred to as "equipment") is created, then the NMS addresses the appropriate network element to retrieve the configuration information and to populate the NMS database with information such as an identification of the rack and shelves, the NT card(s), or the LT card(s). Also, when a DSLAM NT card is instantiated, an associated ATM physical port is created on the card. When a DSLAM/Mini-Ram LT card is created, four associated adslPorts4 are created on the card. The action for each NT card that may be retrieved in the physical DSLAM may include the following: if the DSLAM NT card already exists in the NMS database, then no action is taken; and if the DSLAM card does not exist, a new DSLAM NT card is instantiated and is associated with the appropriate slot. The actions for each LT card that may be retrieved in the physical DSLAM may include the following: if the DSLAM LT card already exists in the NMS database, no action is taken; if the DSLAM card does not exist, a new DSLAM LT card is created and is associated with the appropriate slot; four adslPorts are instantiated and associated with the DSLAM LT card; and if within the range of LT cards retrieved, there is a DSLAM LT card in the database but no corresponding LT card is retrieved from the physical DSLAM, no notification is set to the user by the NMS. No automatic deletion occurs in NSM, preferable.

Upon creation of the building location of the DSLAM or the Mini-Ram in the NMS database, the configuration information (such as the racks, shelves, slots, cards, NT cards, LT or LTT1 cards, and associated card configurations, etc.) of the DSLAM or the Mini-RAM is obtained, and the configuration information is populated in the NMS database as appropriate. When a DSLAM LT card is instantiated, an associated ATM physical port may be created on the card. When a DSLAM LT card is created, either four associated adslPorts, or four associate LTT1 ports, may be created for the appropriate card. The actions for each NT card retrieved in the physical DSLAM may be the following: if the DSLAM NT card already exists in the database, no action is taken; and if the DSLAM card does not exist, a new DSLAM NT card is instantiated and is associated with the appropriate slot—also an ATM physicalPort is instantiated as appropriate and associated with the DSLAM card. The actions for each LT card retrieved in the physical DSLAM may include: if the DSLAM LT (or LTT1) card already exists in the NMS database, no action is taken; if the DSLAM card does not exist, a new DSLAM LT (or LTT1) card is created and is associated with the appropriate slot; four adslPorts or four LTT1 ports are instantiated and associated with the DSLAM LT or LTT1 card; and if within the range of LT cards retrieved, there is a DSLAM LT (or LTT1) card in the database but no corresponding LT card was retrieved from the physical DSLAM, no notification is set to the user by NMS. No automatic deletion occurs in the NMS database, preferably. As additional ADSL ports are needed, the CO DSLAM may be populated by more racks for these additional ports. The information about the CO DSLAM in the NMS database then can be edited to reflect the changes.

In action 120, a building location is created for each of the appropriate ATM switch(es) that support the ADSL network. The creation of the building location for an ATM switch may include supply of the following information: a CLLI; and an Internet Protocol (IP) address. In action 130, a building location is created in the NMS database for each NSP location having an NSP link in the NMS database. As a prerequisite to the creation of the building location of an ATM switch, a special service circuit (such as a circuit designed in TIRKS) and installed should be assigned to the physical link between the NSP/ISP and the ATM network.

Still referring to FIG. 2, actions 140-170 include creation of appropriate physical links in the NMS database. As a prerequisite to the creation of a physical link, it must have been provisioned and installed in the physical network. The circuit ID of the physical link must be determined as well as of the two matching physical ports to which the physical link connects. A physical port for an NSP may be unknown. The NSP port may be indentified as a P0I or POP. The configuration information for a physical link may include the following: CLLI codes for each of the ports connected by the link (an NSP name may be used in place of a CLLI code for an NSP's port); circuit ID; and circuit type. The physical link is created if the physical ports for both locations match (are of the same type). For example, valid combinations may include: port type on DSLAM card—port type on ATM network; port type on Mini-Ra—card port type on CO DSLAM; or location type NSP—port on ATM network. For physical links between an ATM switch and a CO DSLAM, a message trunk access code (TGAC) may be used rather than a message trunk circuit ID. The port type is derived from the underlying facility type, which may include T1 (DS1), T3 (DS3), 0C3 or 0C12. A new circuit ID is preferably used for physical lines between a remote DSLAM and an ATM switch, and a Mini-Ram and a CO DSLAM.

In action 140, the appropriate physical links are created in the NMS database between each NSP and ATM network. In action 150, the appropriate physical links between the CO DSLAM and the ATM network are created in the NMS database. In action 160, the appropriate physical links are created in the NMS database between the remote DSLAM and the ATM network. In action 170, the appropriate physical links between the Mini-Ram and connecting (sub-tending) CO DSLAM are created in the NMS database.

Provisioning of a Permanent Virtual Connection

With the creation of the network in the NMS database (an exemplary network creation having been described above in connection with FIG. 2), the NMS may be used to provision or "fill" a service order from a customer. Typically, the customer indicates his or her desire for DSL or ADSL service from his or her terminating unit to a network service provider (NSP) (also referred to as an Internet service provider ISP)), and a service order is completed and provided to the NMS for provisioning. A service order contains information relating to the customer and his or her service. Advantageously, the customer information collected in the service order is sufficient according to the methods and systems described herein for such customer information to be mapped so as to model a path for the user's services from the user's terminating unit to the NSP.

The service order for the customer may include the following information: the customer's telephone number; the customer's name or other identifier; an identifier such as a port name for the central office, DSLAM, or Mini-RAM appropriate for the customer; an exchange key such as the NPA-NXX of the customer's telephone number; an identifier for the selected NSP's circuit; an identifier for the selected NSP's virtual path identifier (VPI); an identifier for the selected NSP's virtual channel identifier (VCI); and a universal service order code (USOC) for the appropriate type of order for the customer.

Upon receipt of the service order, the customer information is automatically processed by the NMS using the information stored in the NMS database with respect to the overall network. The result is a permanent virtual connection (PVC) (also referred to as a permanent virtual circuit) from the customer's terminating unit through the elements of the overall network to the appropriate port of the NSP or ISP selected by the customer. The customer's PVC may be assigned an identifier referred to as a PVC ID so as to associate the customer with that particular PVC, and for other reasons. Advantageously, through NMS, the customer has the ability to establish high-speed Internet or other global information network access through the customer's plain old telephone service (POTS) line. Of course, for this access, the customer's POTS line has data added to it, but the customer is able to keep his or her POTS telephone number.

Fault Management

Figure 3A:
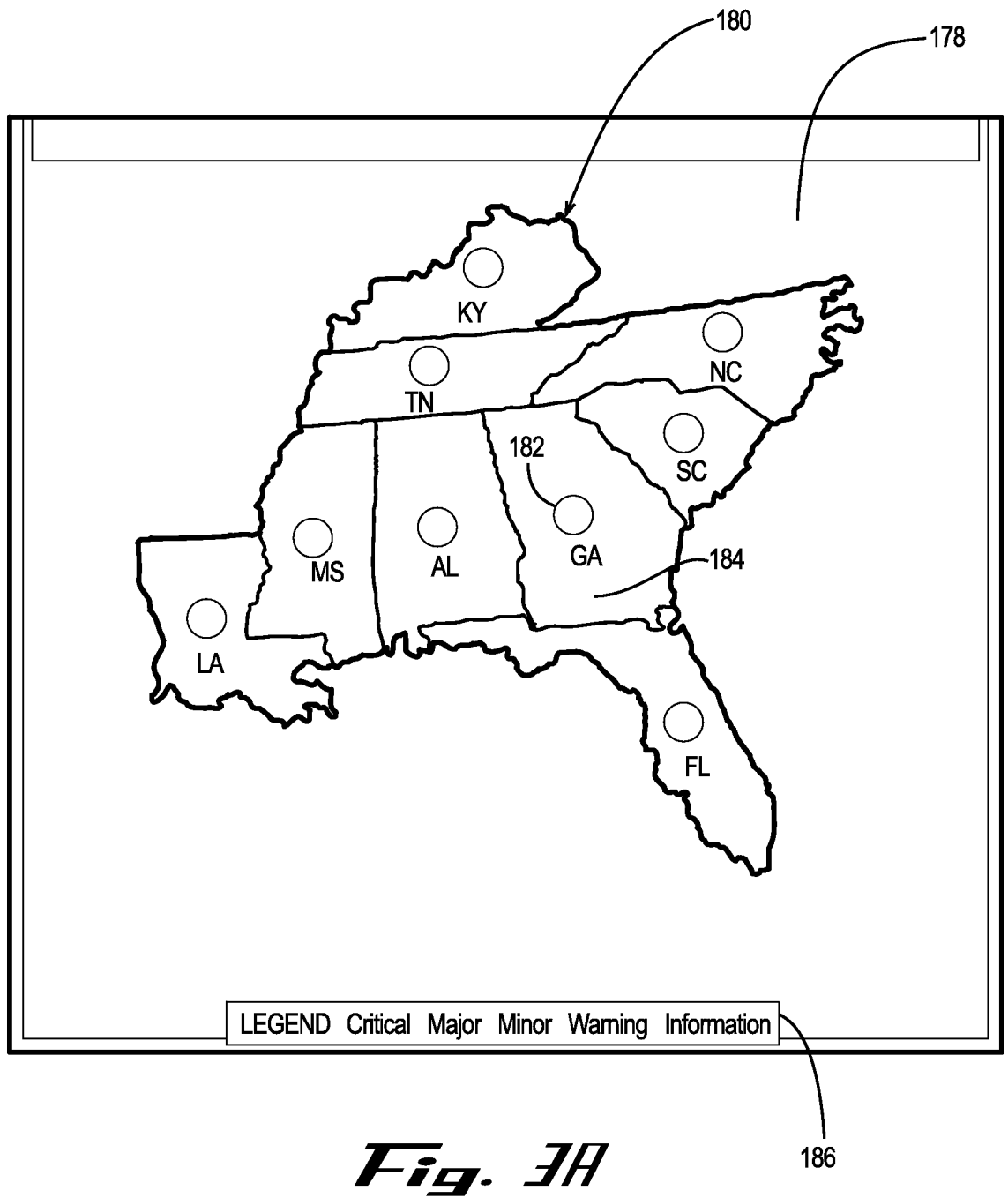
FIGS. 3A-3L illustrate windows and other screen displays that may appear to or be used by a user of a graphic user interface (GUI) of an exemplary NMS in connection with fault management features or functions.

Occasionally, problems will arise with DSL or ADSL equipment. The equipment primarily includes: DSLAMs, ATM switches, and communication ports. Advantageously, the exemplary NMS includes alert indicators to notify the appropriate personnel that such problems have occurred. For example, the NMS may include a graphical user interface (GUI) with a screen 178 of the geographical region served by the equipment, which screen 178 is referred to herein as the region-wide screen. FIG. 3A illustrates such an exemplary screen 178 of a nine-state area 180 of the United States where the equipment may be located. In addition to the nine-state area 180, the region-wide screen 178 includes options along the top of its display that call other exemplary functions of the NMS through the GUI into action. For example, the region-wide screen may include the following actions: File; Window; NetworkCreation; Inv/CapacityMgmt; Programming; Diagnostic; and Service.

Referring again to fault management, as noted, FIG. 3A illustrates the region-wide screen 178 of a nine-sate area 180 of the United States where the equipment of the NMS may be located. Within the representation of each state, a large dot (or circle) is positioned. For example, a large dot 182 is positioned within the representation of the State of Georgia 184. The color of the dot 182 indicates the status of the equipment within that state. The screen 178 also includes a code or legend bar 186 with representations of the correlation between colors of the dots and status of the equipment. For example, a red dot indicates critical conditions; an orange dot includes a major alert; a yellow dot indicates a minor alert; and a green dot indicates a normal status.

An exemplary NMS may include further detail than just the status of the equipment in any particular state as indicated by the dots on the nine-state area 180 illustration. A user may click on or otherwise select any one of the dots and "drill-down" through links associated with the dot to further level of detail included in windows that are presented to the user. The windows provide at least two functions: (1) they allow a user to research and identify the equipment in each state, LATA, building location, and ATM switch; and (2) the windows allow the user to search for, and identify, the source of an alert.

Figure 3B:
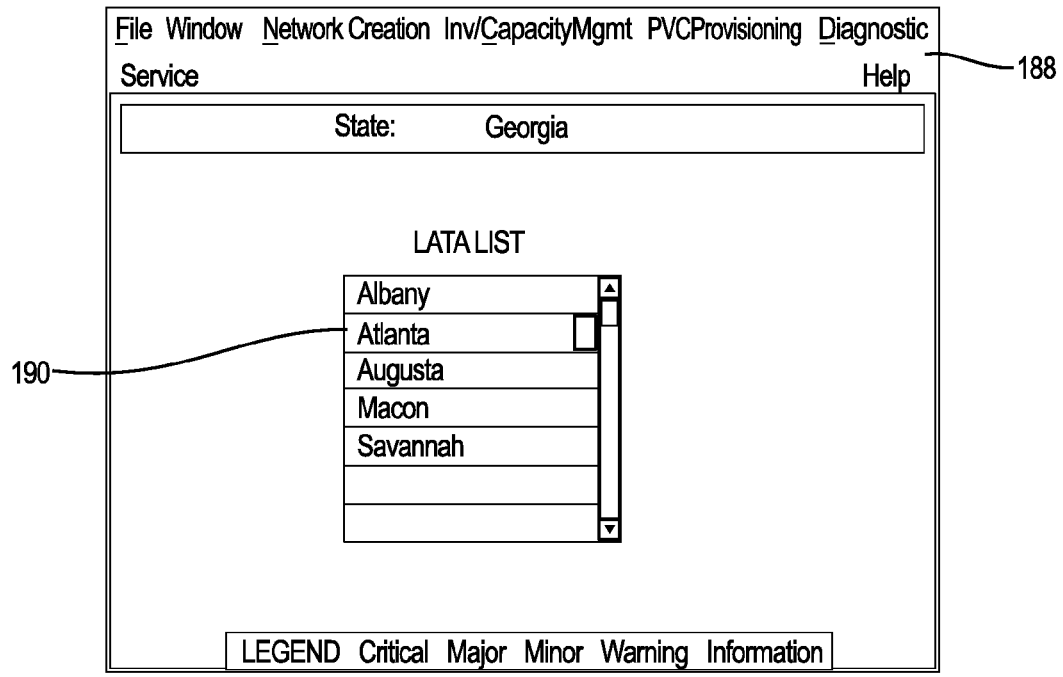
Figure 3C:
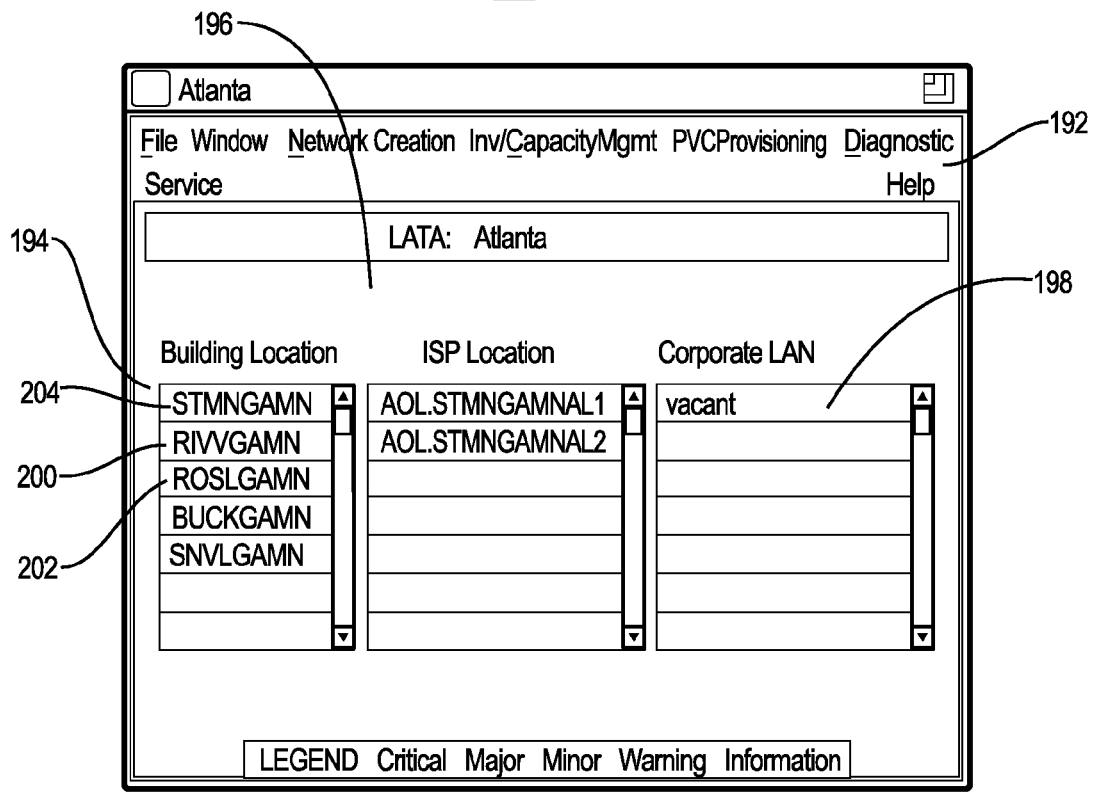
Figure 3D:
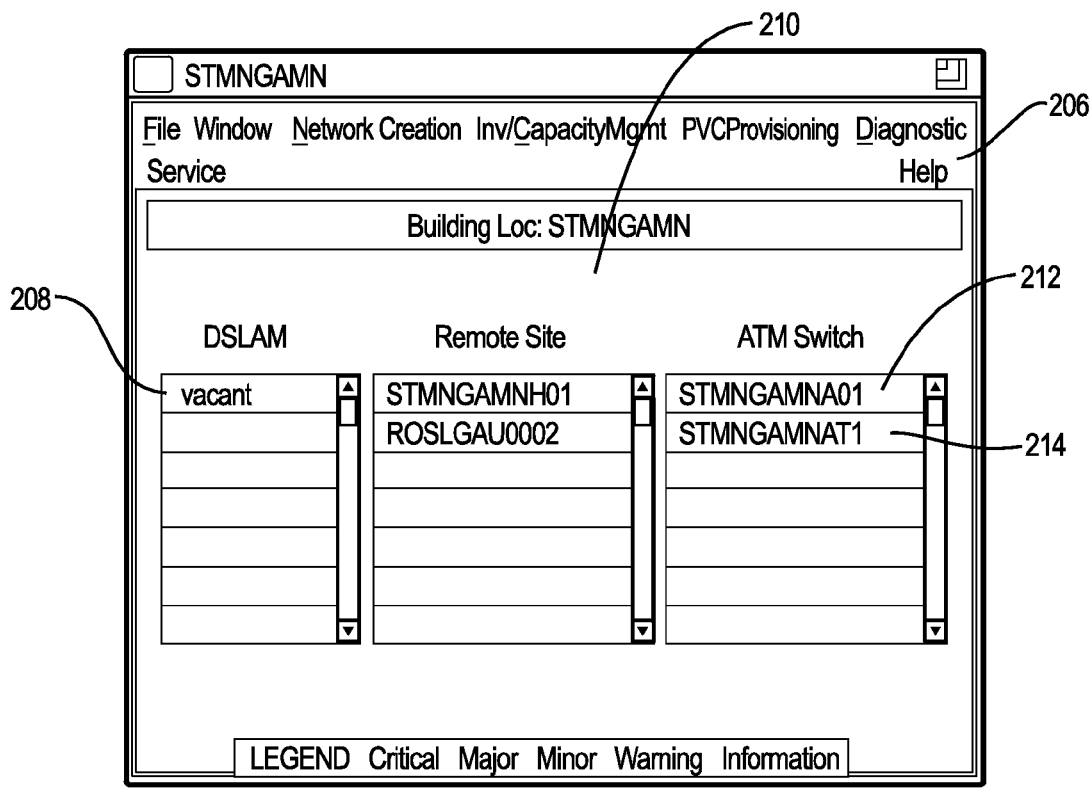

Reference is made to FIGS. 3B-3L for additional details provided in an exemplary fault management segment of an NMS. If a user selects the dot 182 in the representation of the State of Georgia 184 in the nine-state illustration 180, then the next window to appear to the user is the window 188 illustrated in FIG. 3B. Window 188 may be referred to as the "state"window because it includes a listing or other representation of geographical areas having the equipment within the State of Georgia. The list in FIG. 3B includes Albany, Atlanta, Augusta, Macon, and Savannah. The entry for Atlanta 190 in the list in FIG. 3B is highlighted in red indicating a critical status of the equipment in Atlanta. For the next level of detail, the user may select any of the entries in the list, and the next level of detail then is provided in another window. For example, the entry for Atlanta 190 may be selected, and as a result, the window 192 illustrated in FIG. 3C appears. The window 192 includes three columns of entries: building location 194; ISP location 196; and corporate LAN 198. Even further detail may be obtained by selecting any of the entries in the list. For example, the building location column 194 includes two entries that are marked in red: RIVVGAMN 200 and ROSLGAMN 202. But the user does not have to select an entry marked in red for further detail. Referring again to the window 192, assume the user has selected the entry for STM-NGAMN 204 from the building location column 194. By the selection of the entry for STMNGAMN 204, a window 206 with further detail appears as illustrated in FIG. 3D. The window 206 displays the building location for the DSLAM with alert condition. This window 206 includes three column or entries: DSLAM 208; Remote Site 210; and ATM switch 212.

Figure 3E:
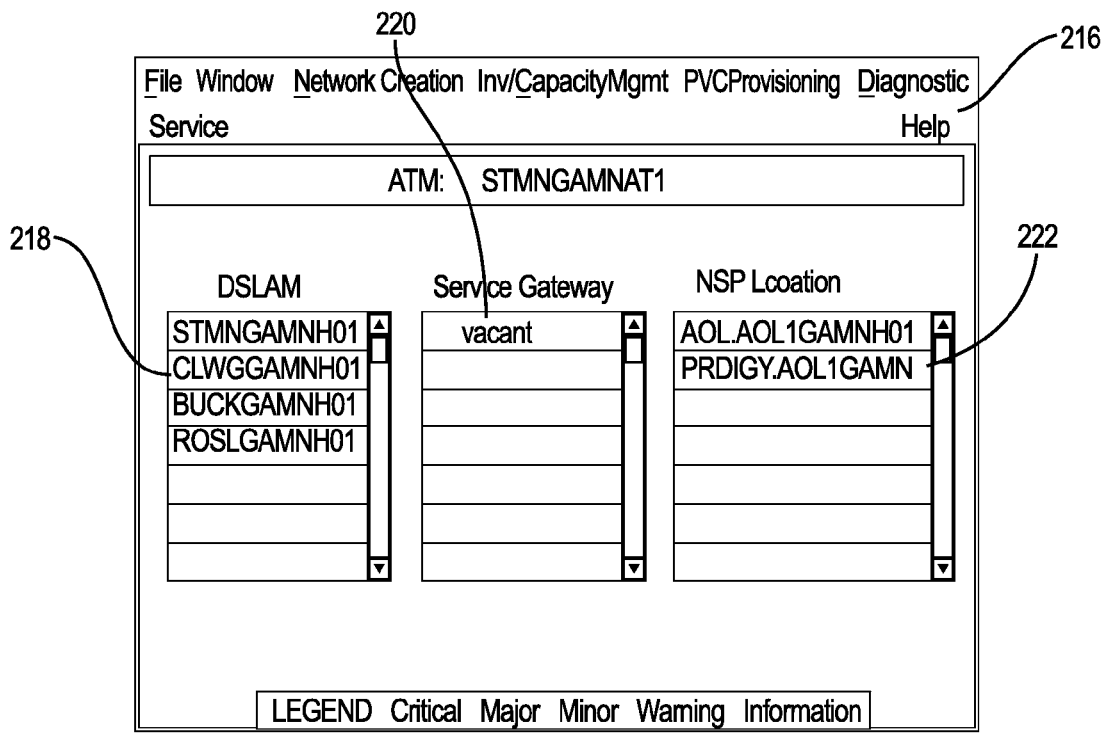
Figure 3F:
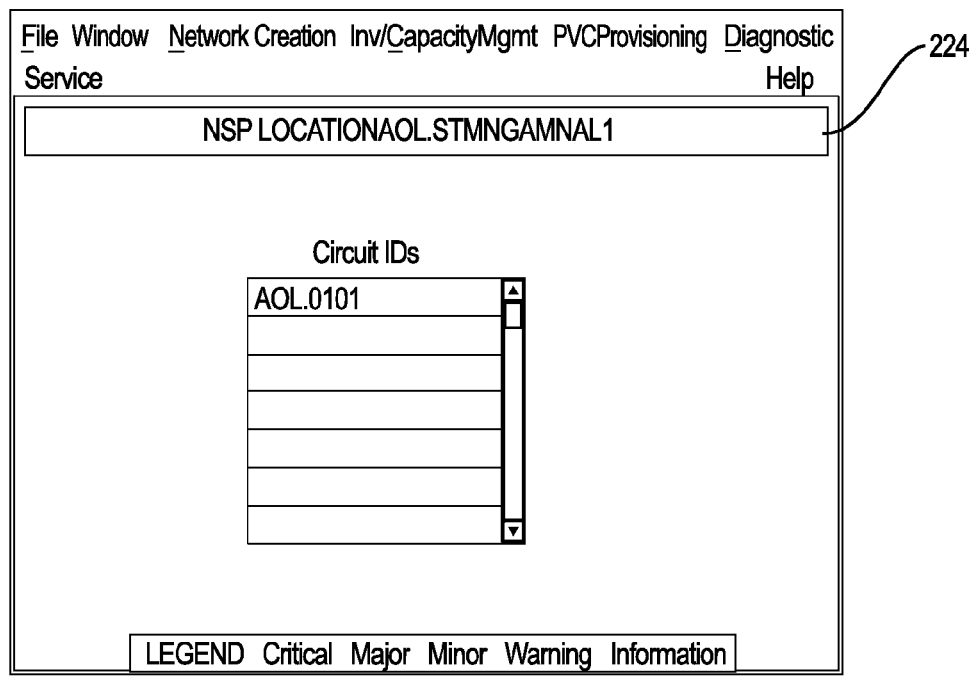

If the user desires to see the equipment that includes a physical connection to the ATM switch, a selection of the ATM switch for the DSLAM (STMNGAMNAT1) 214 may be made. As a result, the ATM window 216 appears as illustrated in FIG. 3E. ATM window 216 includes three columns of entries: DSLAM 218; Service Gateway 220; and NSP Location 222. To view the NSP location, a selection may be made from the NSP Location column 222 with the result that the NSP Location window 224 appears as illustrated in FIG. 3F. The NSP Location window 224 identifies the circuit IDs. An advantage of this window is that it provides information that may be used in connection with the provisioning of a service order. For example, a service order (SO) may fail validation or otherwise fail to process because of an incorrect identified NSP circuit ID. If so, then a user may make use of this drill-down process to compare the circuit ID thought to be correct with the circuit ID on the service order. A mismatch then may be corrected.

The drill-down feature of the exemplary NMS also may be used to view DSLAM-ATM switch connectivity. To illustrate, please refer to the LATA: Atlanta window 192 illustrated in FIG. 3C. If the entry ROSLGAMN 200 in the Building Location column 194 is selected, then the Building Loc: ROSL-GAMN window appears. Like window 206 illustrated in FIG. 3D, the Building Loc: ROSLGAMN window includes three columns of entries: DSLAM; Remote Site; and ATM switch.

Figure 3G:
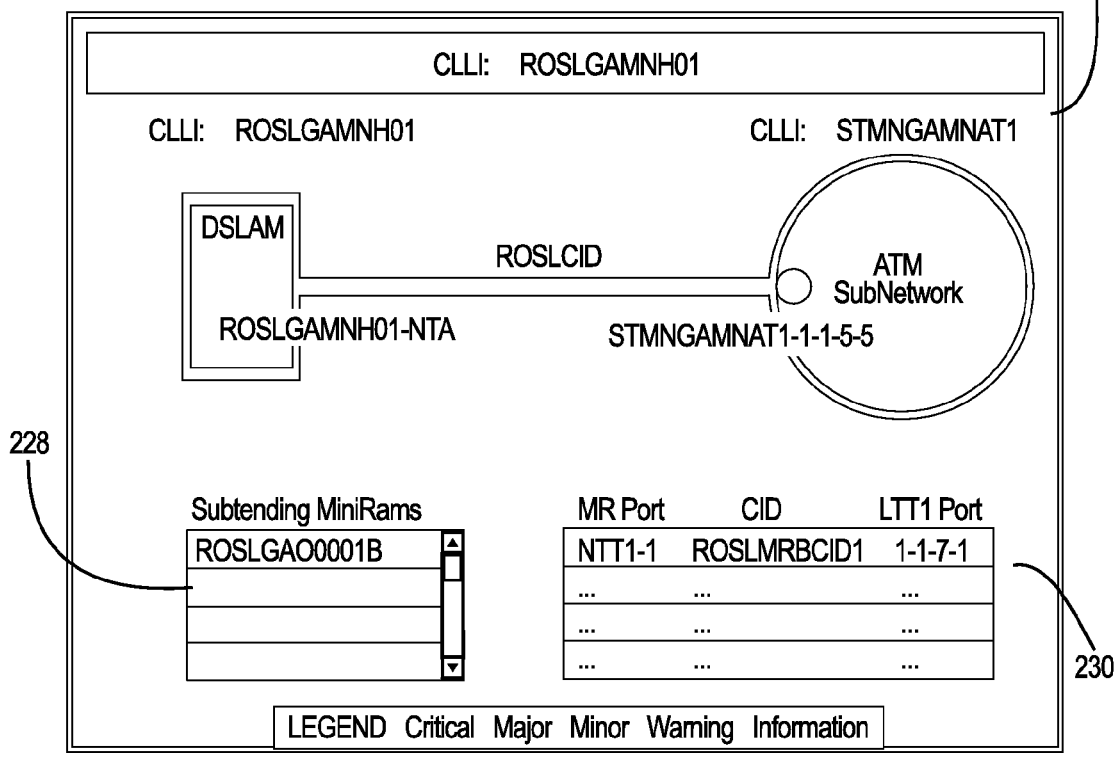

If the DSLAM is selected, then CLLI window for that DSLAM appears as illustrated in the window 226 of FIG. 3G. This window describes the connectivity of the DSLAM to the ATM switch and all the Mini-Rams that are subtending to that DSLAM. The lower, left-hand list 228 displays a list of all subtending Mini-Rams connected to that DSLAM. When a particular Mini-Ram is selected in this list, the list 230 in the lower-right corner of window 226 displays the physical link IDS that are used to connect the selected Mini-Ram to this DSLAM. To obtain a refreshed view of the physical links for any listed DSLAM, click on that DSLAM (in the list 228 on the lower left of the window 226). The refreshed list of the physical links for that DSLAM display (in the list 230 on the lower right of the window 226).

Figure 3H:
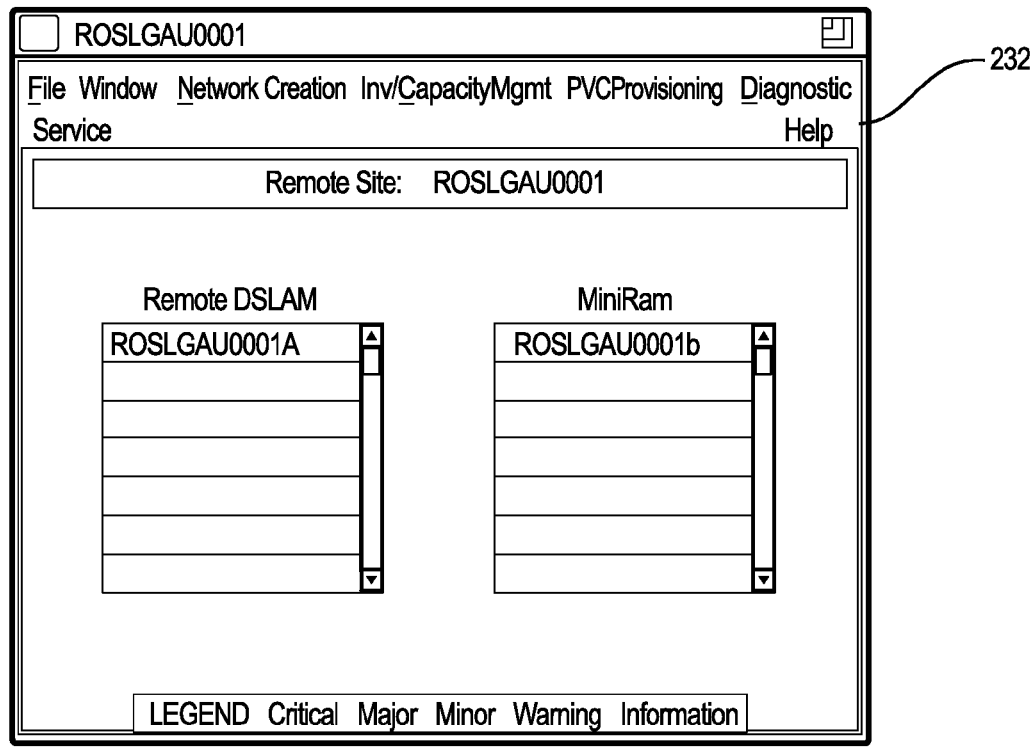

The drill-down feature of the exemplary NMS also may be used to find the CLLIs of the remote site equipment. To begin, find the Building Loc: window (such as window 206 illustrated in FIG. 3D), and select a CLLI in the Remote Site Column 210. As a result of the selection, a Remote Site window 232 as illustrated in FIG. 3H appears. This window 232 provides the CLLIs (preferably twelve-character CLLIs) for DSLAMs and Mini-Rams of the remote site.

Figure 3I:
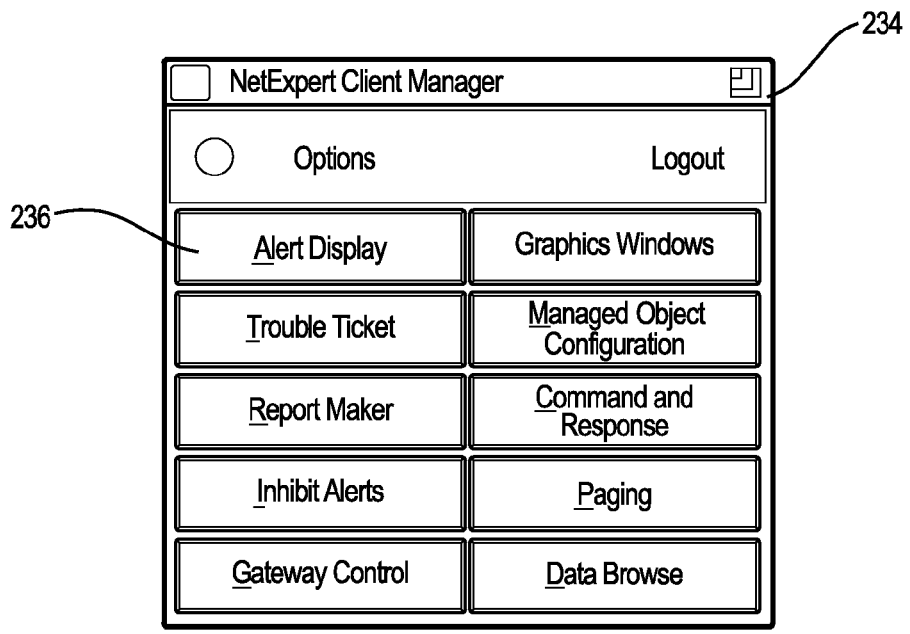
Figure 3U:
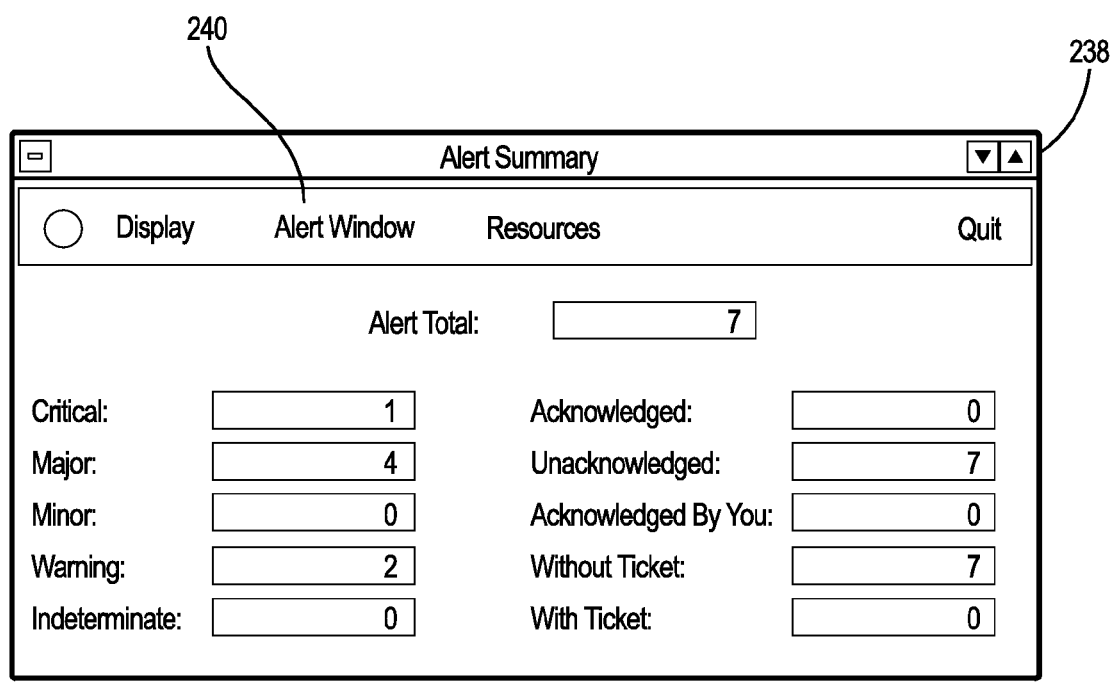
Figure 3L:
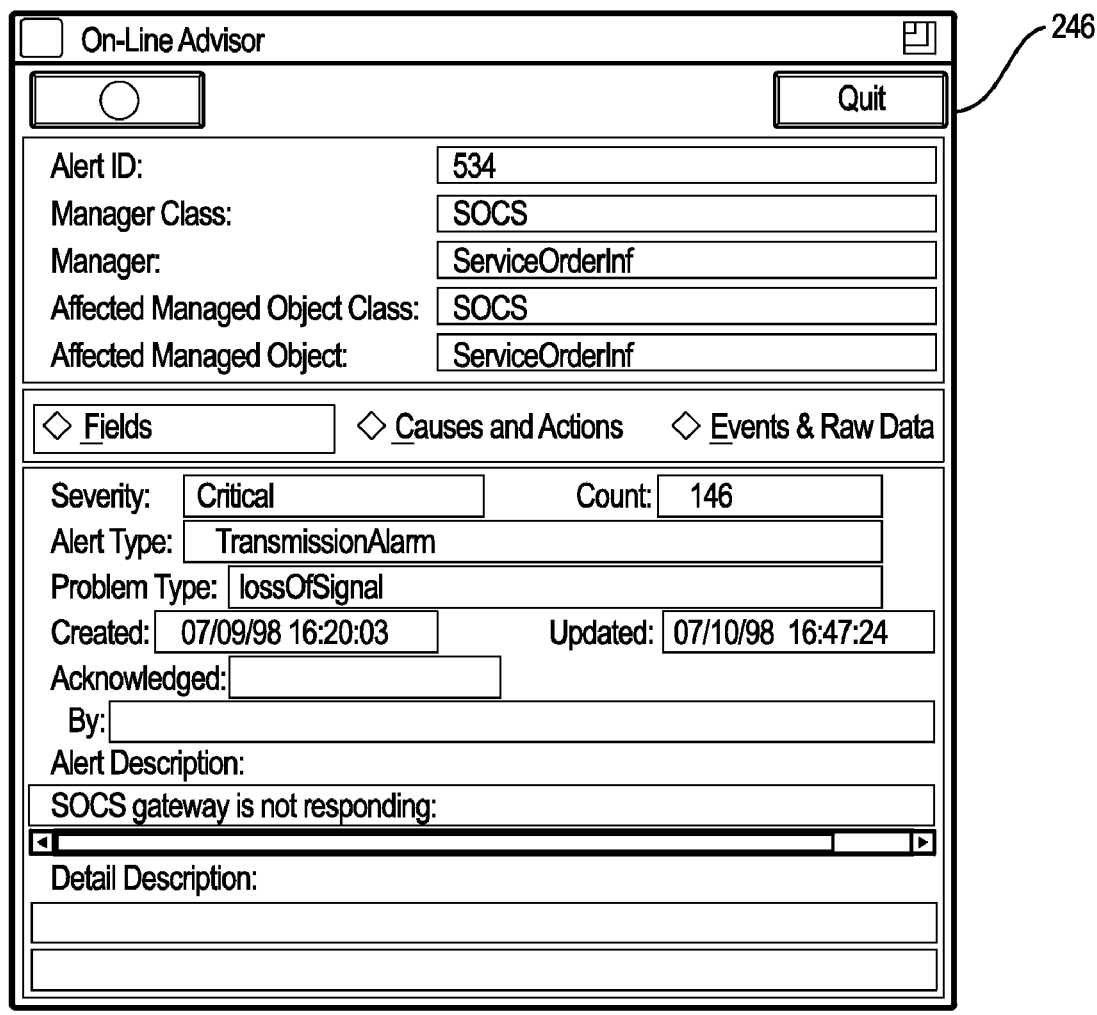

In addition, the drill-down feature of the exemplary NMS may be used to view details regarding an alert. To view the details of an alert, the user opens the NetExpert Client Manager window 234 such as illustrated in FIG. 3I. This window 234 includes several options including an option for "Alert Display"236. By selecting the Alert Display option 236, the Alert Summary window 238 appears as illustrated in FIG. 3J. This window 238 supplies information on the alert. The Alert Summary window 238 provides further options for additional details such as the "Alert Window"operation 240. Selection of the Alert Window option brings about a drop-down menu including an option for "New Window". If the New Window option is selected, then the Alert Display window 242 appears as illustrated in FIG. 3K. The Alert Display window 242 lists entries of alerts. For further information about an alert, it may be selected from this window 242 and the Alert Management option 244 on window 242 selected. A drop-down menu appears that includes an option of On-Line Advisor, which, if it is selected, results in display of an On-Line Advisor window 246 such as illustrated in FIG. 3L. The On-Line Window Advisor supplies details on the selected alert.

The exemplary NMS includes error logs, which are files that contain details of error or problems that have come up within the NMS. These logs can be referenced to discover details of any system-generated error condition. There are six exemplary error logs:

Rma.log: Request for Manual Assistance; contains service order errors;

Act.log: Documents the activities performed from the graphic user interface by a user;

Sys.log: Documents NMS internal errors;

Cust.log: Documents facility failures and provides a list of the affected end-users;

ServicèOrder.log: Maintains a copy of the service orders; and

Interface.log: Maintains a record of interface activity.

The logs may reside in a log directory in the exemplary NMS.

Another feature of the exemplary NMS is that it may be configured to provide notifications such as electronic mail messages (e-mails) when an alert comes into being. For example, when DSLAM capacity approaches established thresholds, then an e-mail may be sent to one or more users.

Diagnostic Functions of an Exemplary NMS

An exemplary NMS also includes diagnostic functions, which may be accessed by a user through use of a graphical user interface (GUI) of the NMS such as through the region-wide screen 178 as illustrated in FIG. 3A. The screen 178 includes an option for "Diagnostic" that may be selected by the user. The diagnostic functions allow the user to research port and PVC connections, and to determine the customers (or other end users) who may be affected by upstream actions.

If the user decides to proceed with diagnostic functions and selects "Diagnostic" from the region-wide screen 178, then a drop-down menu appears including the following features: Translate Port; Customer PVC; Find Circuit Name; Network PVC; and Find Affected End Users.

FIG. 4A illustrates a Translate Port Name window that allows a user to translate between and among the names of ports of elements in the equipment.

The Customer PVC function allows the user to have a network view of how a customer is connected to the overall network. For example, the Customer PVC function allows for the display of a window that includes the customer's VPI/VCI assignment, the COSMOS name, etc. To implement this function, the user may use the Diagnostic-Customer PVC window 242 as illustrated in FIG. 4B. The window 242 includes a customer ID field for the customer's telephone number or other identifier. If this field is populated, then the other field in the window 242, the PVC ID, populates. The user then may proceed to obtain additional information by selecting the "OK" option, which brings up either the PVC ID window 254 as illustrated in FIG. 4C or the PVC ID window 258 as illustrated in FIG. 4D.

Figure 4H:
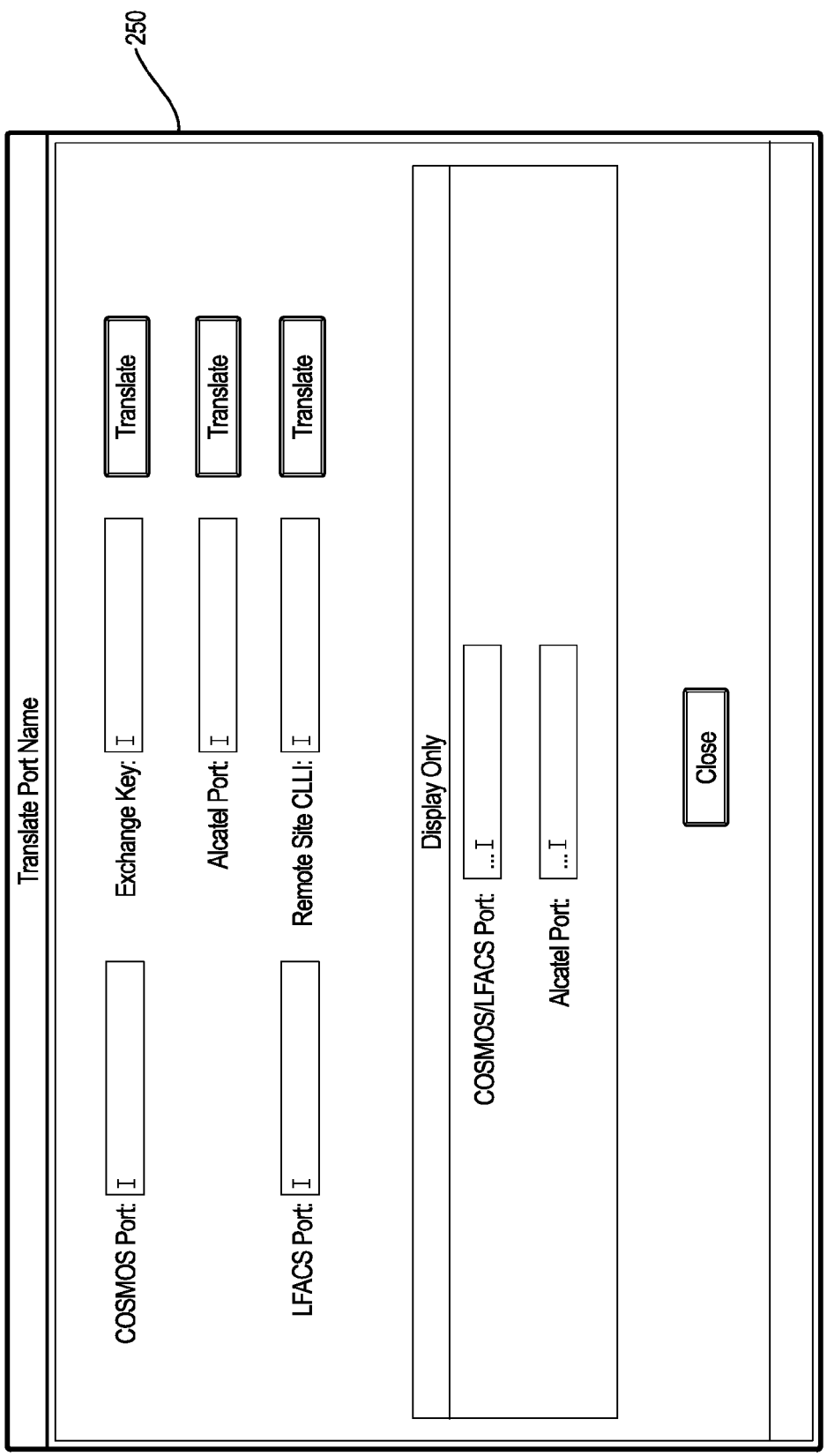
Figure 4B:
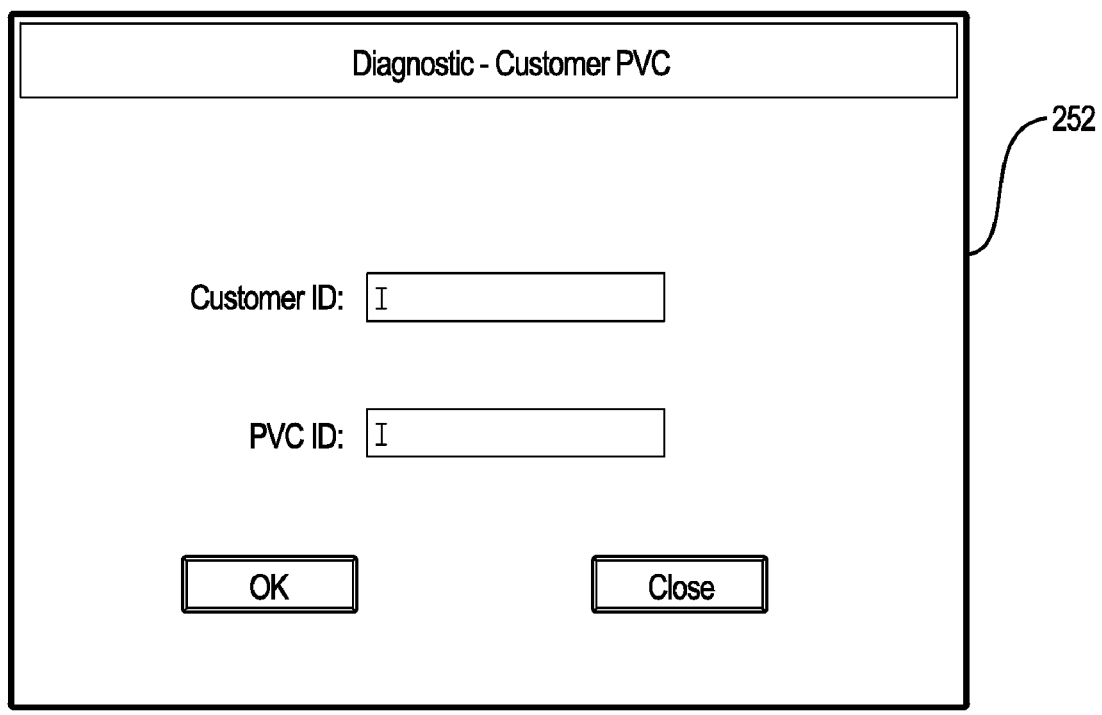
Figure 4C:
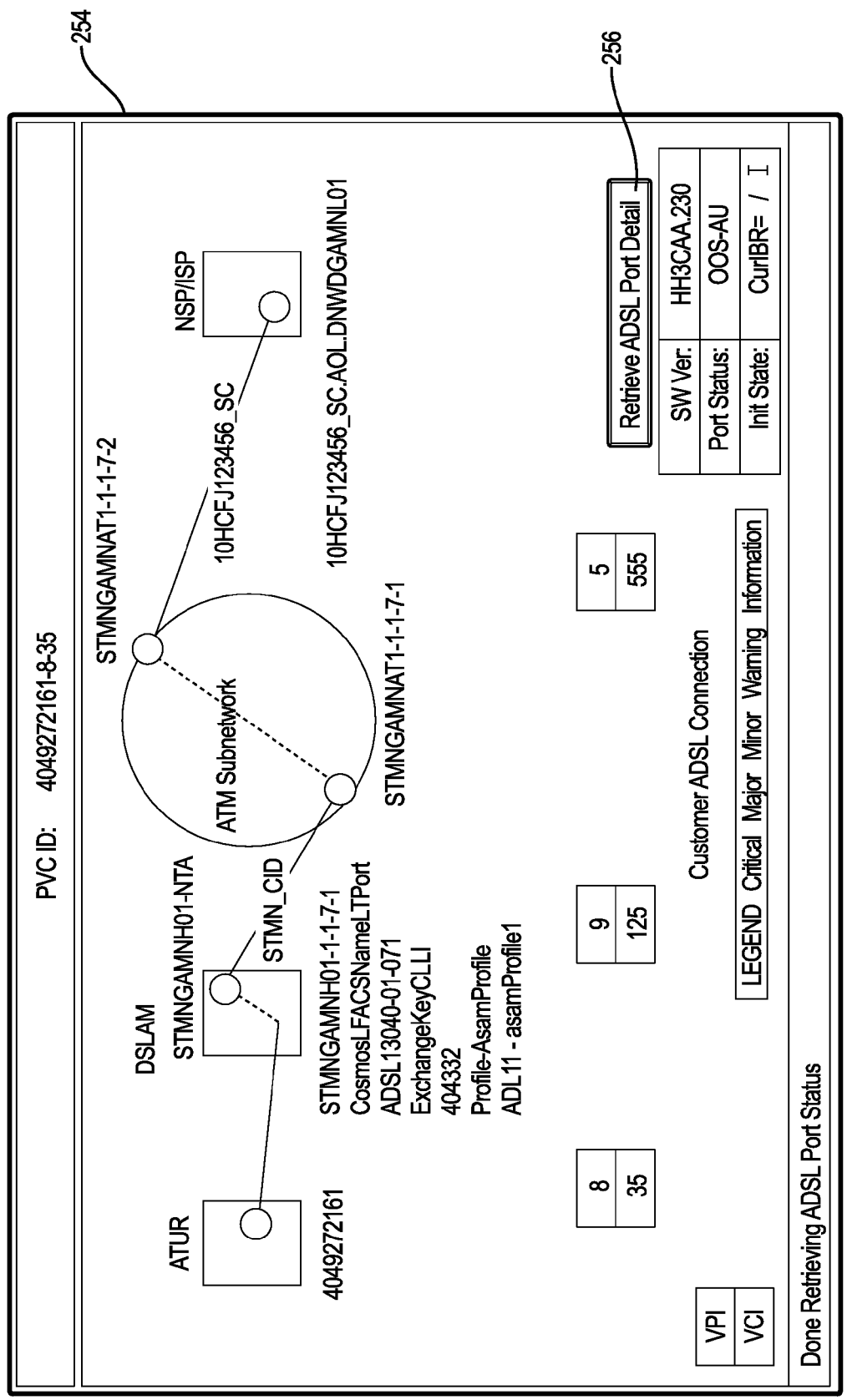

The PVC ID window 254 as illustrated in FIG. 4C provides an end-to-end view of the customer's Direct VCC network connections. This window 254 includes a button 256 for Retrieve ADSL Port Detail. By selecting this button 256, the software version, port status, and the modem initialization state may be retrieved. If any problems exist, then the pertinent information on the window may be highlighted.

Figure 4D:
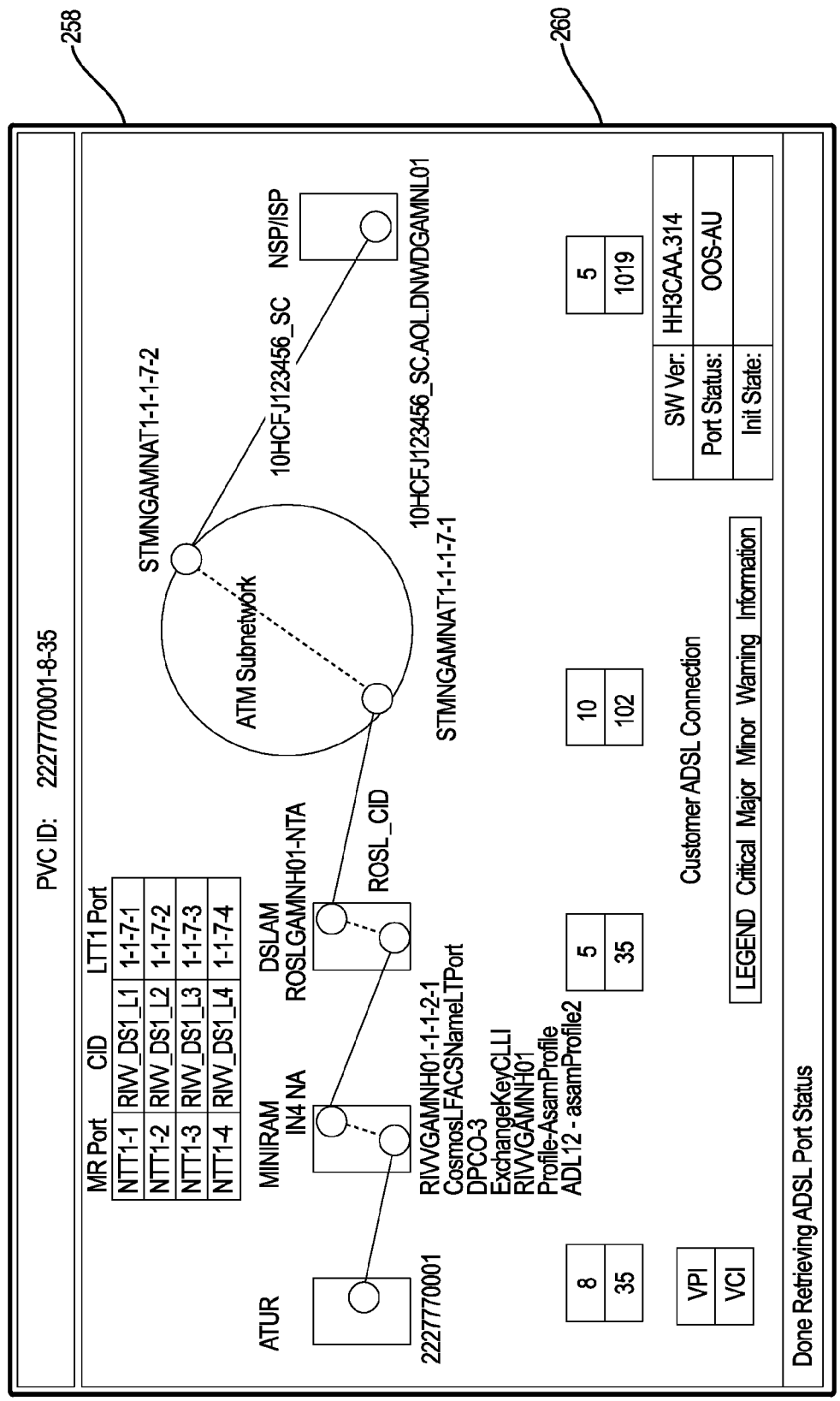

The PVC ID window 258 as illustrated in FIG. 4D provides an end-to-end view of the customer's Subtend VCC network connections. This window 258 includes a button 260 for Retrieve Port Used Detail. By selecting this button 260, the software version, port status, and the modem initialization state may be retrieved. If any problems exist, then the pertinent information on the window may be highlighted.

Figure 4E:
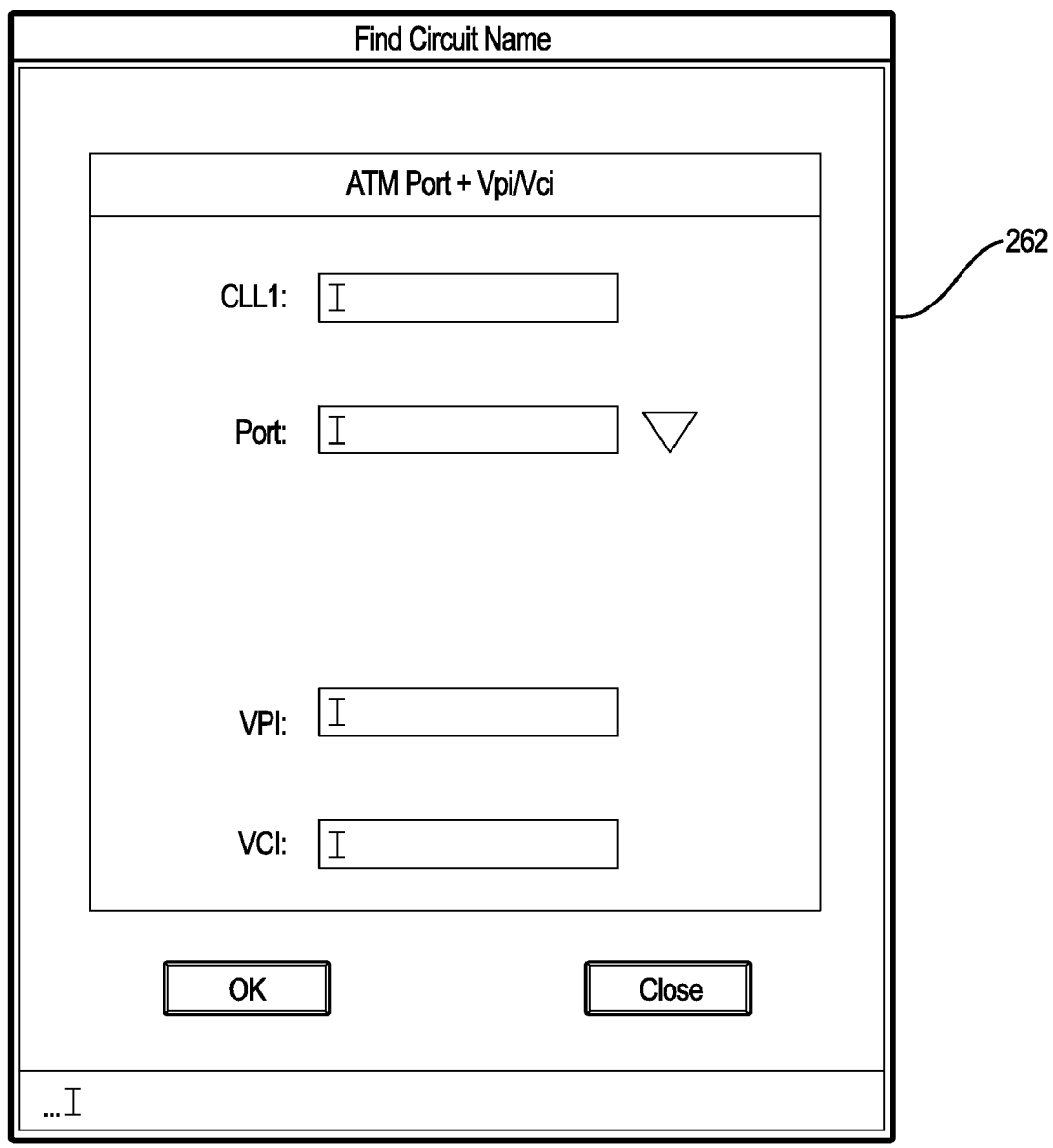

The Find Circuit Name function allows the user to display any duplicate VPI/VCI assignments. To implement this function, the user may use the Find Circuit Name window 262 illustrated in FIG. 4E. The window 262 includes a field for CLLI, which if populated, then the port field in the window 262 also populates. If the port then is selected, an any duplicate VPI/VCIs exist, then they will show up on the status bar fields included in the window 262.

Figures 4F, 4G:
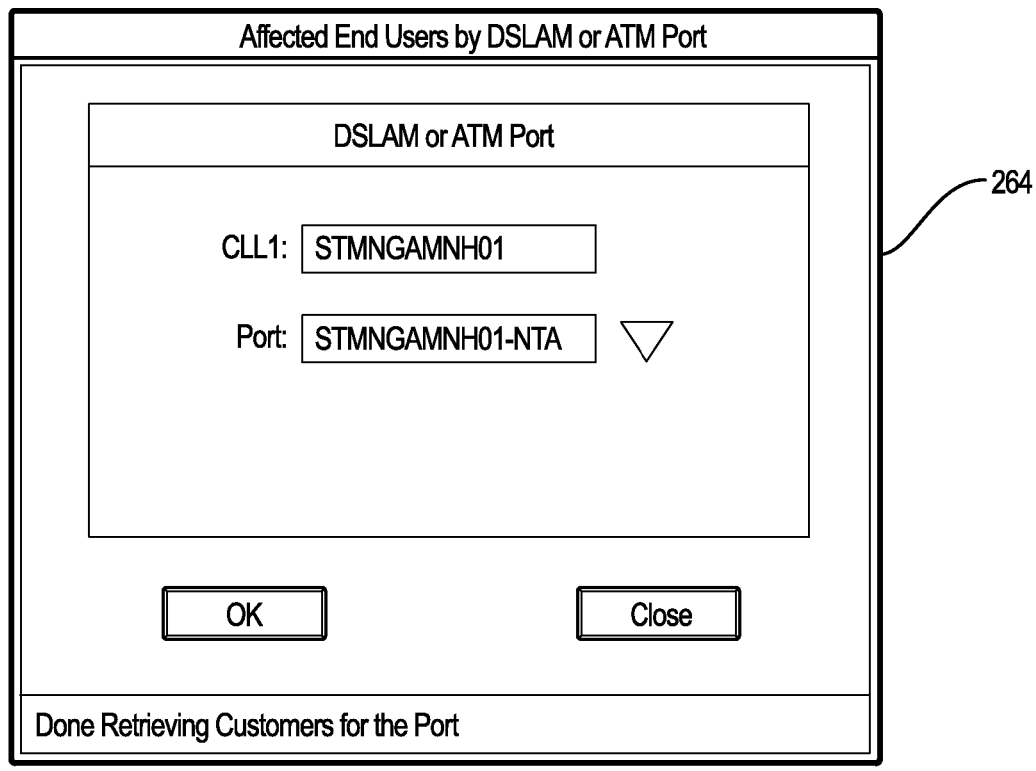
Figure 4H:
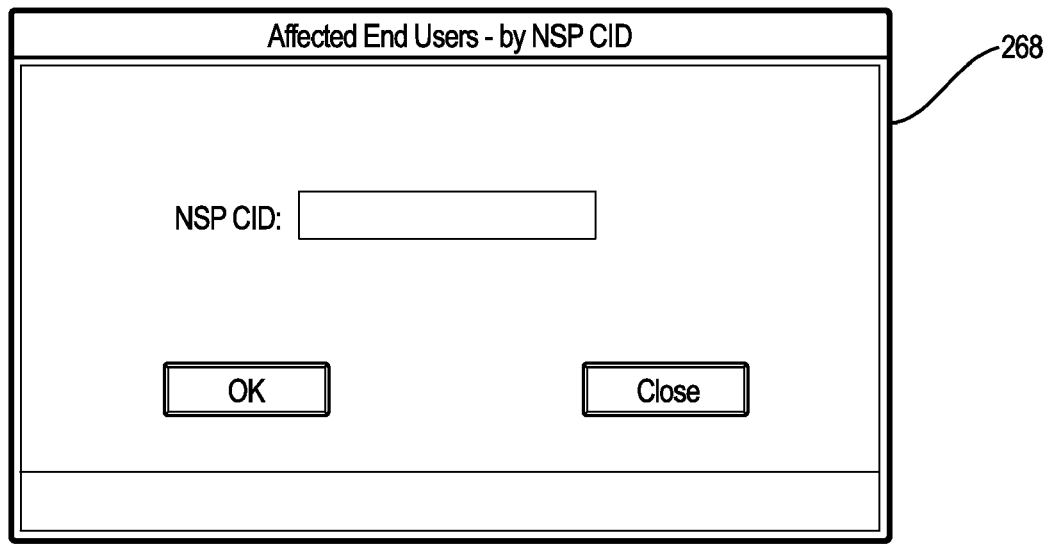

The Find Affected End Users function is accessed through the region-wide screen 178 and the drop-down menu of the Diagnostics option. The user is presented with further options of DSLAM-ATM or NSP. If the DSLAM-ATM option is selected, then an Affected End Users by DSLAM or ATM Port window 264 such as illustrated in FIG. 4F may appear. If the CLLI field in this window 264 is completed with the CLLI of either an DSLAM or ATM switch, then the port field in the window 264 populates. From the pick list on the Port: field, the user may select a port or accept a default port. As a result, an Affected End Users of (for example: STMNGAMNO1-NTA) window 266 as illustrated in FIG. 4G appears. This window 266 includes entries with the following information: PVC ID, ADSL Port ID; and Subscriber identifier.

If the NSP option is selected from the Find Affected End Users function, then an Affected End Users—by NSP CID window 268 as illustrated in FIG. 4H may appear. If the NSP CID field in this window 268 is completed, then the Affected End Users of (for example: STMNGAMHO1-NTA) window 266 as illustrated in FIG. 4G appears. This window 266 includes entries with the following information: PVC ID; ADSL Port ID; and Subscriber identifier.

Capacity and Inventory Management

The exemplary NMS includes features related to capacity and inventory management of DSLAM network ports. For example, an Inventory/Capacity Management function may be accessed through the region-wide screen 178. This function includes the following features on a drop-down menu: DSLAM/Mini-Ram Assigned Port History; DSLAM Port Capacity; Mini-Ram Port Capacity; Edit Capacity Threshold; DSLAM/Mini-Ram Port Inventor; and DSLAM/Mini-RAM Card Inventory.

Figure 5A:
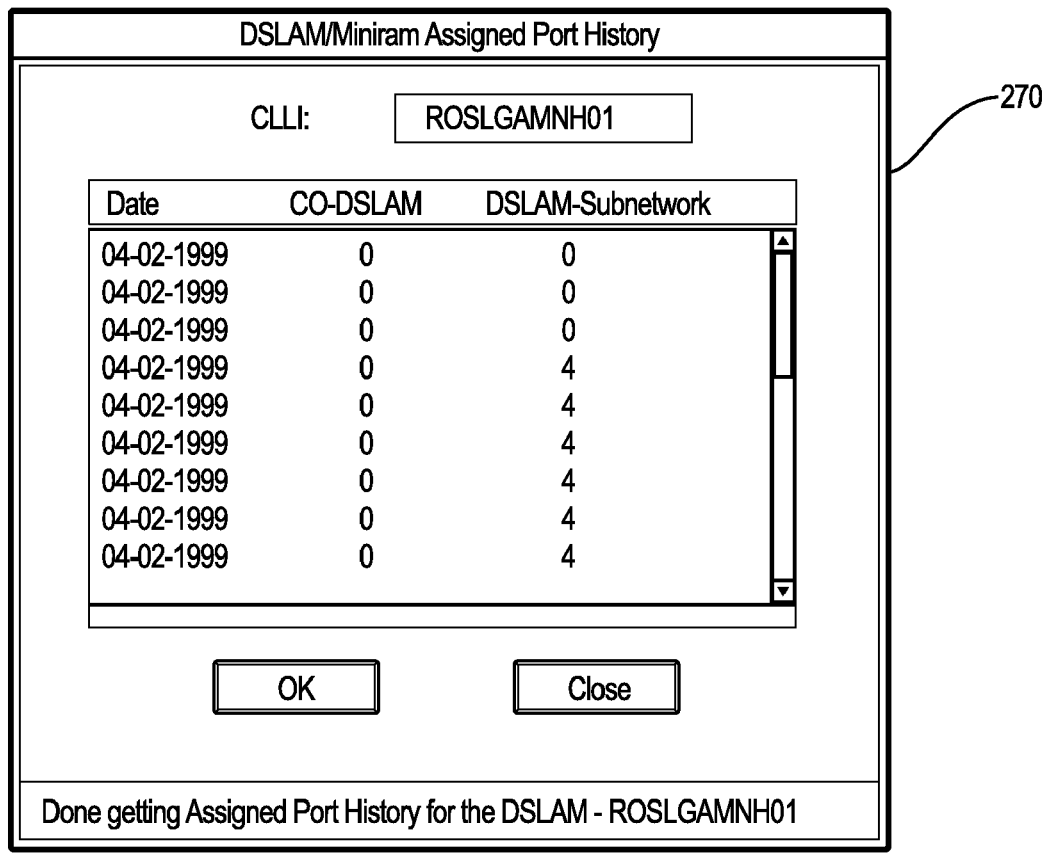

If DSLAM/Mini-Ram Assigned Port History is selected from the drop-down menu, then FIG. 5A illustrates a DSLAM/Mini-Ram Assigned Port History window 270, which is presented, as its name implies, for the display of the assigned port history of a DSLAM or Mini-Rarn. If either the DSLAM or Mini-Ram CLLI is entered into the appropriate field, then history data including the date, central office (CO), and network is displayed in this window 270.

If DSLAM Port Capacity feature is selected from the drop-down menu, then FIG. 5B illustrates window 272, which is presented for display of the ADSL network (DSLAM and subtending Mini-Rams) port capacities and thresholds, and the network percentage of use. The DSLAM information displays the availability and thresholds of the ADSL ports of only a specific DSLAM. The network information displays a combination of the ADSL ports on the DSLAM and on all its subtending Mini-Rams. The subtending Mini-Rams information that is displayed is for specific ADSL ports on the Mini-Ram and does not include ADSL ports on the DSLAM. The thresholds are set via the DSLAM capacity threshold screen or window. To obtain the appropriate information, the user supplies the DSLAM CLLI, and the field populates with its assigned ports data.

Figure 5C:
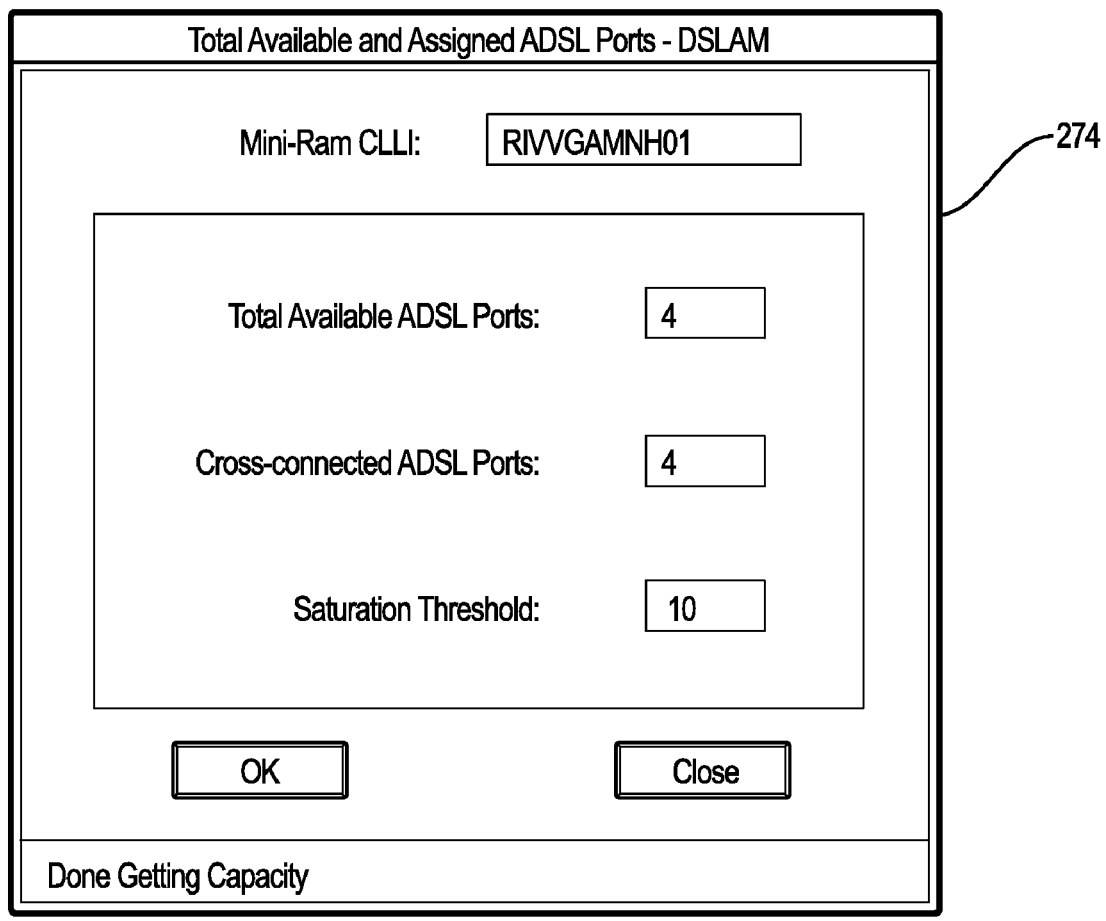

If Mini-Ram Port Capacity is selected from the drop-down menu, then FIG. 5C illustrates window 274, which is presented for display of the ADSL port availability and saturation thresholds for specific Mini-Rams. The thresholds are set via the DSLAM capacity threshold screen. To obtain the information desired, a Mini-Ram CLLI is entered, and the field populates with its assigned ports data.

Figure 5D:
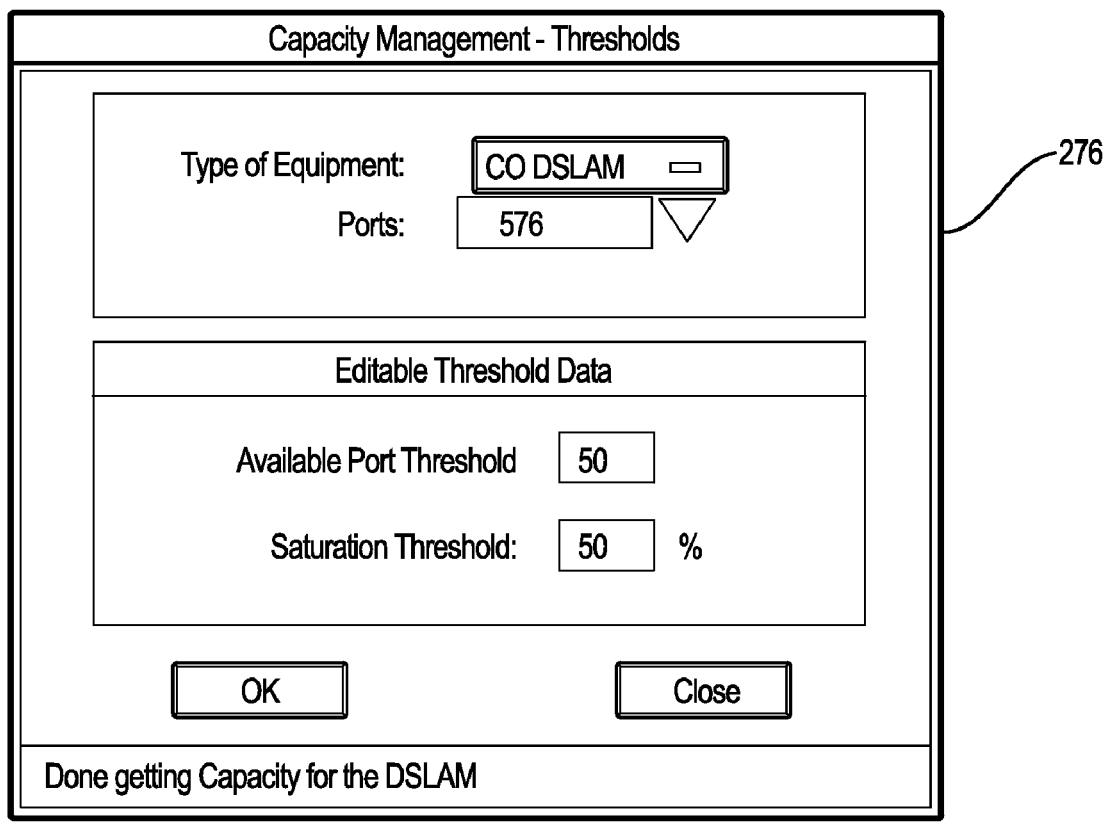

If the Edit Capacity Threshold is selected from the drop-down menu, then there are three further drop-down menu choices: Default DSLAM/Mini-Ram, Per DSLAM, and Per Mini-Ram. The default DSLAM and Mini-Ram thresholds are viewed and accessed through the Capacity management-Thresholds window 276 such as illustrated in FIG. 5D. The thresholds are global default values for all DSLAMs, preferably. Threshold alarms are generated under the following conditions:

Actual percentage use is greater than threshold available ADSL=alert

Actual number of available ports is less than threshold for available ADSL port=alert.

To display the window 276, the user selects Inv/CapcityMgmt from the region-wide screen 178, then selects Edit Capacity Threshold, and then Default DSLAM/Mini-Ram. The Capacity Management—Thresholds window 276 may be used to set the default port availability threshold and saturation thresholds for a CO DSLAM, remote DSLAM, or Mini-Ram. The values illustrated in window 276 are exemplary default values. In the Available Port Threshold: field of the window 276, the value is an absolute number. In the Saturation Threshold field of the window 276, the value is a percentage of 576, which is the maximum capacity of a DSLAM. This value could reasonably be increased to 80%.

The Per DSLAM option brings up the Capacity Management Thresholds window 278 such as illustrated in FIG. 5E. This window 278 may be used to set the default port availability threshold and saturation thresholds for a specific CO DSLAM/remote DSLAM. Percentage utilization=(number of cross-connected ports) divided by the total DSLAM ports (576). In the window 278, in the CLLI field, if the CLLI is entered and the retrieve command button is clicked, then the other fields populate according to the DSLAM selected. In the Saturation threshold field, the new value entered overrides the globally established default value. An alarm in inhibited (once a DSLAM is full), when the Saturation Threshold Alarm Inhibited field of the window 278 is changed from its value of 0 to 1. When an alarm is enabled, the systems produces alarms any time the threshold is reached. In the Available Port Threshold field of the window 278, entry of the new value overrides the globally-established default value. To inhibit an alarm (once a DSLAM is full), proceed to the Ports Available Alarm Inhibited field of window 278 and change its value from 0 to 1. When an alarm is enabled, the system produces an alarm any time the threshold is reached.

The Per Mini-Ram option brings up the Capacity Management—Mini-Ram Thresholds window 280 as illustrated in FIG. 5F. This window can be used to set the default port availability threshold and saturation thresholds for a specific Mini-Ram. Percentage utilization=(number of cross-connected ports) divided by the total Mini-Ram ports (8 or 16). Three fields may be entered on this window 280. In the window 280, in the CLLI field, if the CLLI is entered and the retrieve command button is clicked, then the other fields populate according to the Mini-Ram selected. In the Saturation threshold field, the new value entered overrides the globally established default value. An alarm in inhibited (once a DSLAM is full), when the Saturation Threshold Alarm Inhibited field of the window 280 is changed from its value of 0 to 1. When an alarm is enabled, the systems produces alarms any time the threshold is reached.

The Per Mini-Ram option brings up the DSLAM/Mini-Ram Port Inventory window 282 as illustrated in FIG. 5G. When the CLLI is entered in the CLLI field, the information populates as shown in the window 282 including type; COSMOS/LFACS; Assigned; Status; Denied; and Subtending. ADSL Port is in the configuration of (for example):

STMNGAMNH01-1-1-2-1, where the first 121 characters represent the DSLAM CLLI; and the next 4 digits, the rack, shelf, card, and port. COSMOS port is in the configuration (for example):

ADS130100-01-061, where the first 7 characters represent the DSLAM CLLI; the next 3 are the rack, shelf, and card.

Cross-connect status will either be OOS (Out of Service) or IS (In Service). This status is collected from the NMS.

Port status is either OOS-AU, OOS-AUMA, OOS-MA, IS-NR, or blank (if it is administratively out of service=denied service]). OOS indicates that no ATUR is connected; IS indicates connection.

The DSLAM/Mini-Ram Card Inventory menu selection brings up the DSLAM/Mini-Ram Card Inventory window 284 such as illustrated in FIG. 5H. The window 284 displays the inventory of DSLAMs, remote DSLAMs, or Mini-Rams. The card inventory contains information, such as the software version and vendor information. In the exemplary window 284 of FIG. 5H, the window includes data such as card number; type; SW version; vendor; serial number; and status. To display the desired information, the CLLI is entered and the fields populate.

Service Management

The exemplary NMS may include service management functions to manage bulk PVC, deny, restore, or edit service, edit a customer's record, delete a service order, and modify the customer's profile. The service management functions include seven features that may be accessed via a drop-down menu from the option "Service" on the region-wide screen 178 as follows: Bulk PVC; Deny Service; Response Service; Edit Service; Edit Customer Record, Delete Service Order, ATUR-NSP; and ATUR-Service Gateway.

Figure 6B:
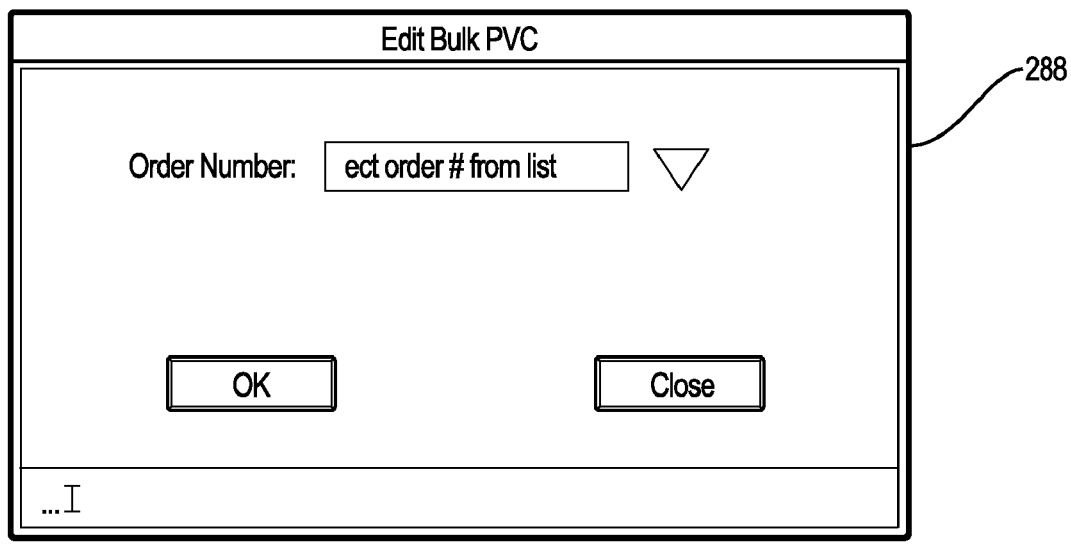
Figure 6D:
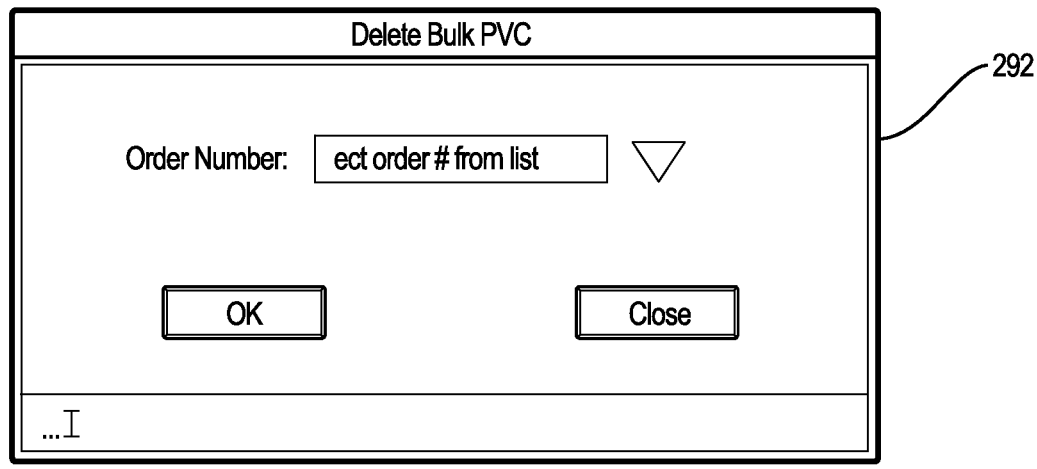

For the Bulk PVC feature, three menu selections appear on a further drop-down menu as follows: Add Bulk PVC; Edit Bulk PVC; and Delete Bulk PVC. In particular, if the user selects the Add Bulk PVC, then window 286 as illustrated in FIG. 6A appears. The bulk PVC is used to move all logical circuits from one physical link to another. The new ATM port changes the physical link Z end point. All PVCs are moved on the due date. Failure to move any PVC generates an alert. The bulk PVC order can be edited using the Edit Bulk PVC menu option which generates the window 288 as illustrated in FIG. 6B. To edit, a service order number is selected from the pick list in the Order Number field, and then the Edit Bulk PVC window 290 as illustrated in FIG. 6C appears. In window 290, in the Old NSP CID field, the old NSP circuit ID is entered. IN the CLLI field, the CLLI is entered. The rack and shelf fields contain default values and are skipped. In the Slot field, the slot number is entered. In the Port field, the port number is entered. The Due Date and Time fields are option, but may have information entered in them, if desired. If the Delete Bulk PVC is selected, then window 292 as illustrated in FIG. 6D appears. To delete, the order number from which the user wishes to delete the bulk PVC order is selected.

Figure 6E:
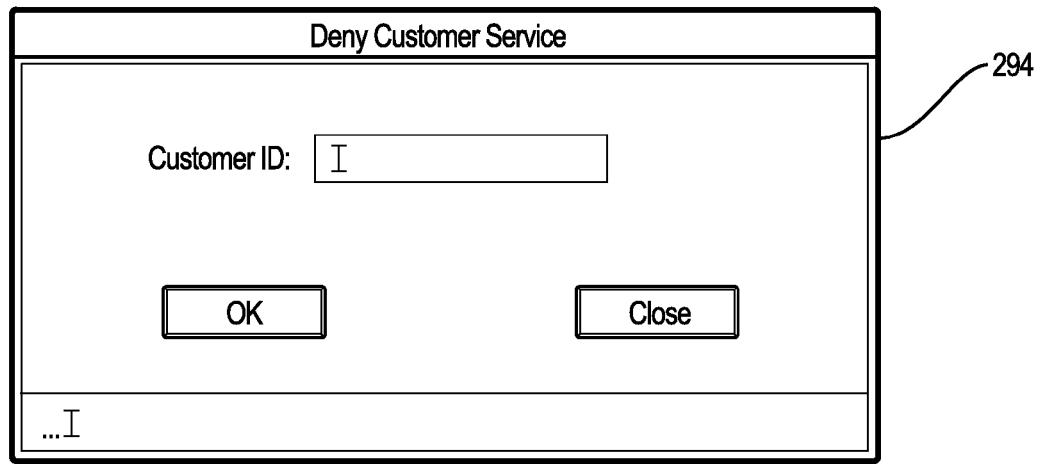

For the Denying Service feature, if the Deny Service option is selected, then the window 294 as illustrated in FIG. 6E displays. In the Customer ID field, the customer's telephone number is entered. Then, the Deny Customer Service action is committed to the database.

Figure 6F:
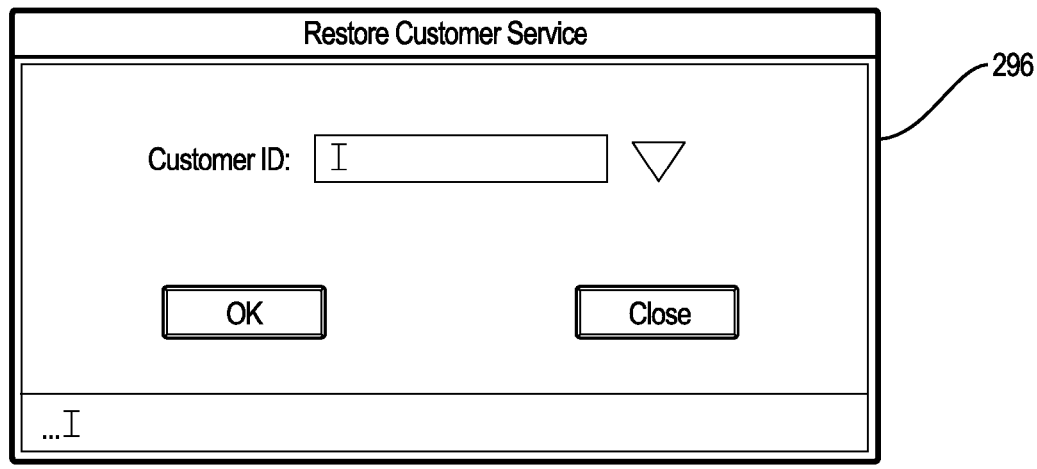

For the Restoring Service feature, if the Restore Customer Service option is selected, then the window 296 as illustrated in FIG. 6F displays. In the Customer ID field, the customer's telephone number is entered. Then, the Restore Customer Service action is committed to the database.

Figure 6G:
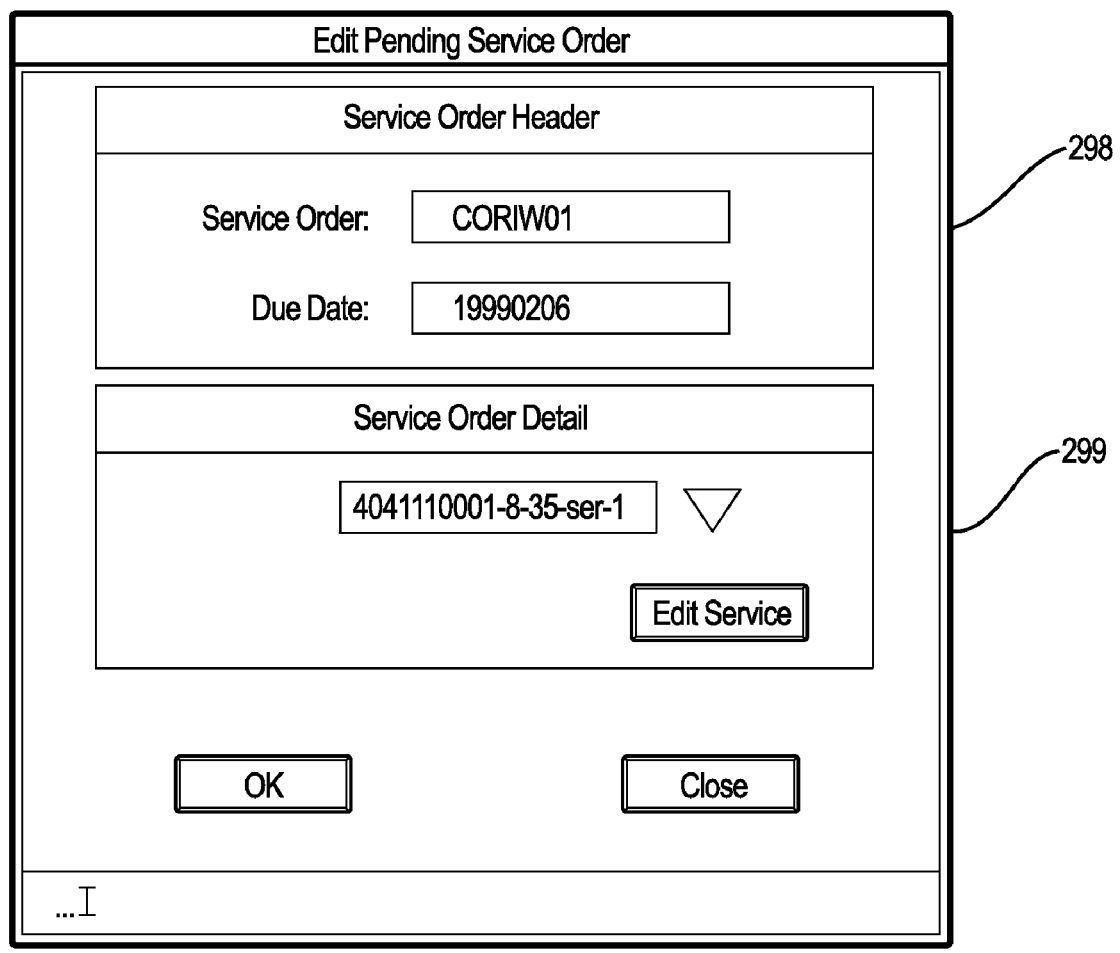

For the Editing Service feature, if the Edit Service option is selected, then the window 298 as illustrated in FIG. 6G displays. To change the due date, in the Service Order field of window 298, the service order number is entered, and then the Due Date and Service Order Detail fields populate. A detail of a service order may be further edited by clicking on the triangle 299 under the heading the Service Order Detail in the window 298, by selecting a desired item (such as TN_VPI-VCI-I) from the list presented, and then by clicking on Edit Service. As a result, window 300 as illustrated in FIG. 6H appears. In the exemplary embodiment the field for the telephone number cannot be changed, but other appropriate changes may be made.

Figure 6I:
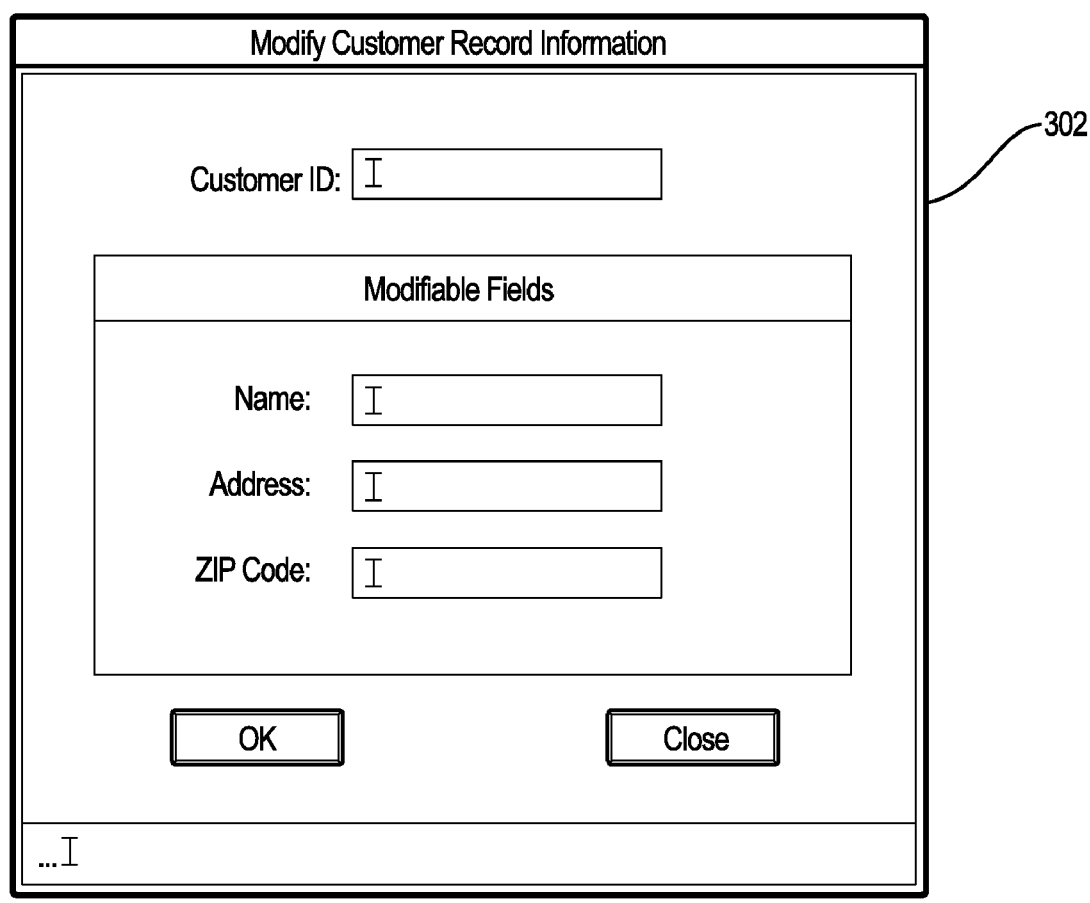

For Editing a Customer Record feature, if the Edit Customer Record option is selected, then window 302 as illustrated in FIG. 6I displays. In response to input of the customer's telephone number in the Customer ID field, the other three fields populate (name, address, and zip code).

Figure 6J:
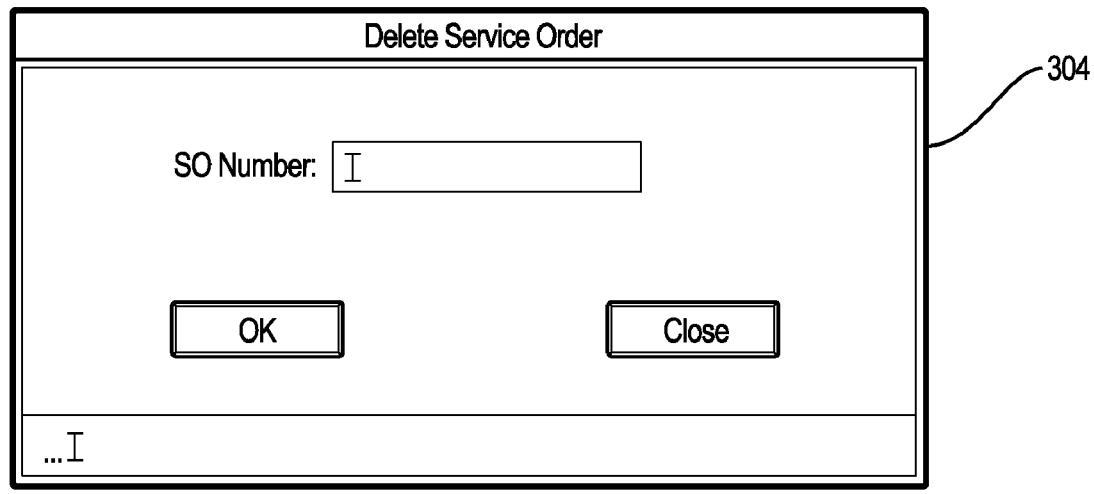

For Deleting a Service Order feature, if the Delete Service Order option is selected, then window 304 such as illustrated in FIG. 6J displays. This feature is recommended to be used only in emergency situations. Once the service order number is entered in the SO Number field, the service order is deleted.

Figure 6K:
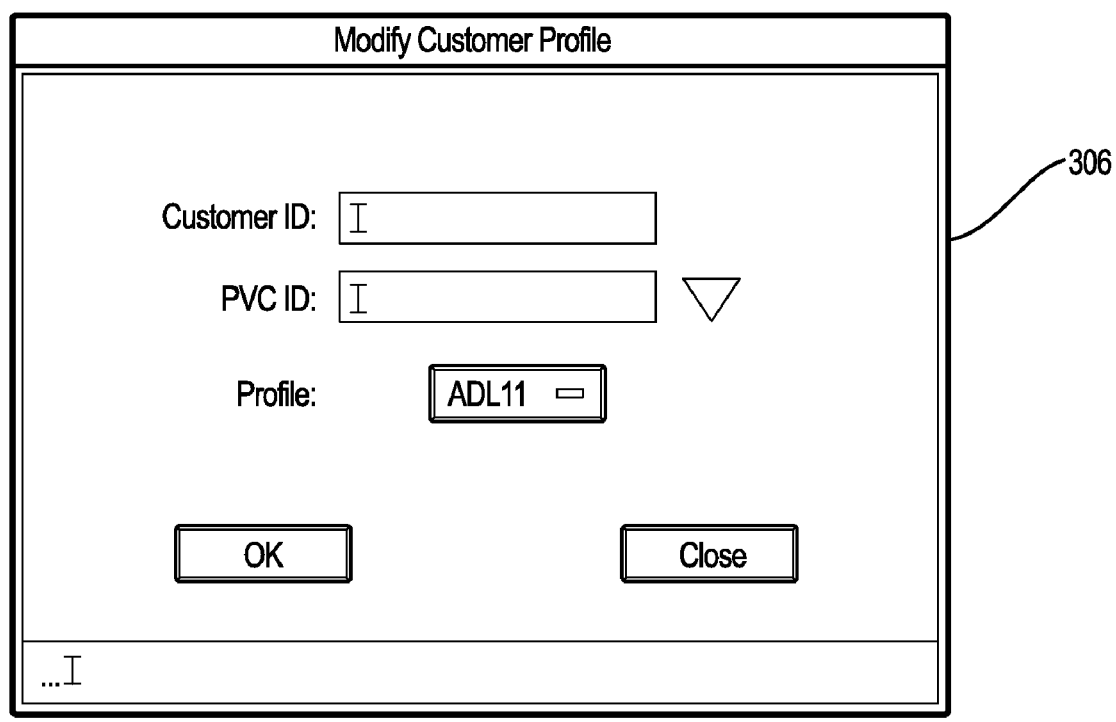

The Modify a Customer's Profile feature is used to reduce a customer's ADSL connections speed to a maintenance mode. For Modifying a Customer's Profile feature, if the Modify Customer's Profile option is selected, then window 306 such as illustrated in FIG. 6K displays. The Customer ID field is filled with the customer's telephone number, and then the pick list field in the PVC ID field populates with a PVC selection. The user may click on the triangle in the window 306, and select a PVC from the list that displays. The maintenance profile (Maint) then may be selected from the list.

Deleting Network Elements

The above description included details about exemplary network creation in the NMS database. The exemplary NMS allows for the deletion of network elements from the network. Interdependent elements may be deleted in the NMS database in the following sequence:

Physical link: DS1, DS3, OC3, or OC12
Mini-Ram
NSP; DSLAM; ATM switch
Remote site
Location (type Building Location, NSP)

Individual components of a network element generally may not be deleted. The deletion of a DSLAM causes the automatic deletion of all of its associated racks, shelves, cards, and physical ports.

The drop-down menus for deleting network elements are accessed through the region-wide screen 178, and particularly, through use of the NetworkCreation option on the region-wide screen 178.

Figure 7A:
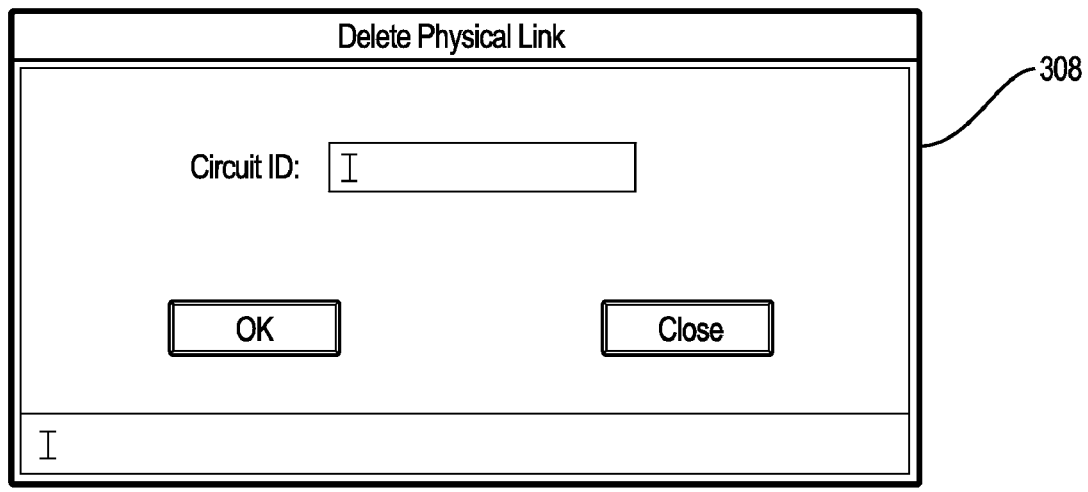
FIGS. 7A-7F illustrate windows and other screen displays that may appear to or be used by a user of a graphic user interface (GUI) of an exemplary NMS in connection with management features or functions relating deleting network elements.

To delete a physical link, the NetworkCreation option leads to a drop-down menu that includes Physical Link, which should be selected, and then the Delete Physical Link option should be selected. The Delete Physical Link window 308 as illustrated in FIG. 7A appears. In the Circuit ID field, the circuit ID may be entered. The data then is committed to the database.

Figure 7B:
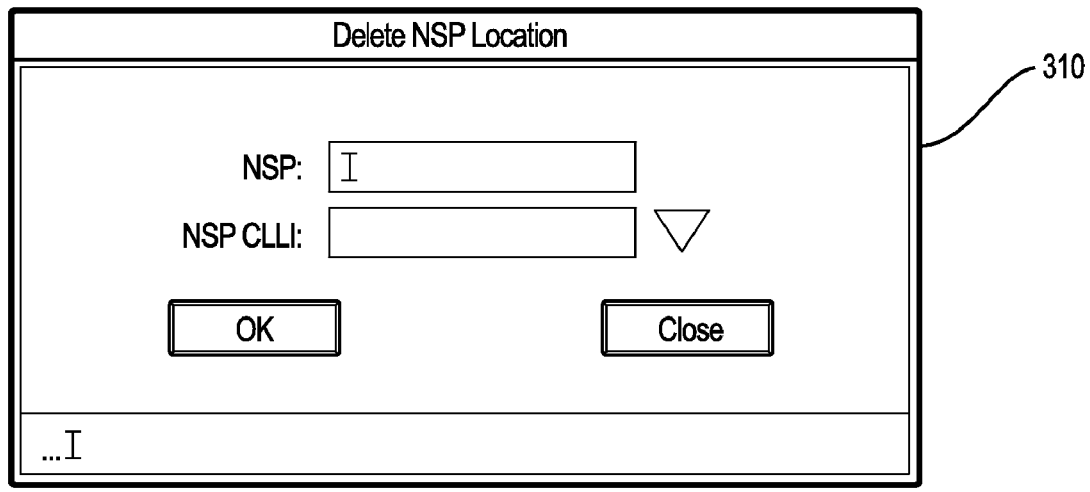

To delete an NSP, certain prerequisites must have been satisfied: it must be verified that all PVCs have been disconnected from the NSP to the DSLAM; and it must be verified that each physical link connecting the NSP to the ATM network is deleted from the NMS. Once these prerequisites have been satisfied, then to delete an NSP, the NetworkCreation option leads to a drop-down menu that includes NSP, which should be selected, and then the Delete NSP should be selected. The Delete NSP Location window 310 appears as illustrated in FIG. 7B. In the NSP field, the NSP name is entered, and the CLLI field populates. The delete is committed to the database.

Figure 7C:
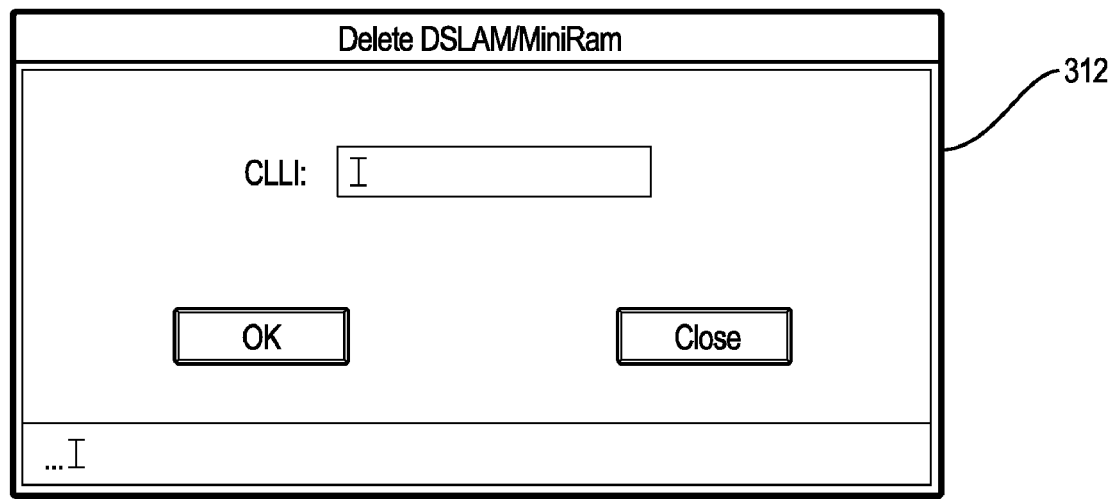

To delete a DSLAM or a Mini-Ram, certain prerequisites must be satisfied: it must be verified that the DSLAM or Mini-Ram as a whole does not support any ATM PVCs; no PVCs should exist on the DSLAM or Mini-RAM; all customers assigned to the DSLAM must be disconnected; all PVCs must be removed before any further action can take place; the physical link, connecting the DSLAM to the ATM network must be deleted; and the physical port on the edge of the ATM network that terminated the physical link must be deleted. Once these prerequisites have been satisfied, then to delete a DSLAM or a Mini-RAM, the NetworkCreation option leads to a drop-down menu that includes DSLAM/Mini-Ram, which should be selected, and then the Delete DSLAM/Mini-Ram should be selected. The Delete DSLAM/Mini-Ram window 312 appears as illustrated in FIG. 7C. In the CLLI field, the CLLI code is entered, and the delete is committed to the database.

Figure 7D:
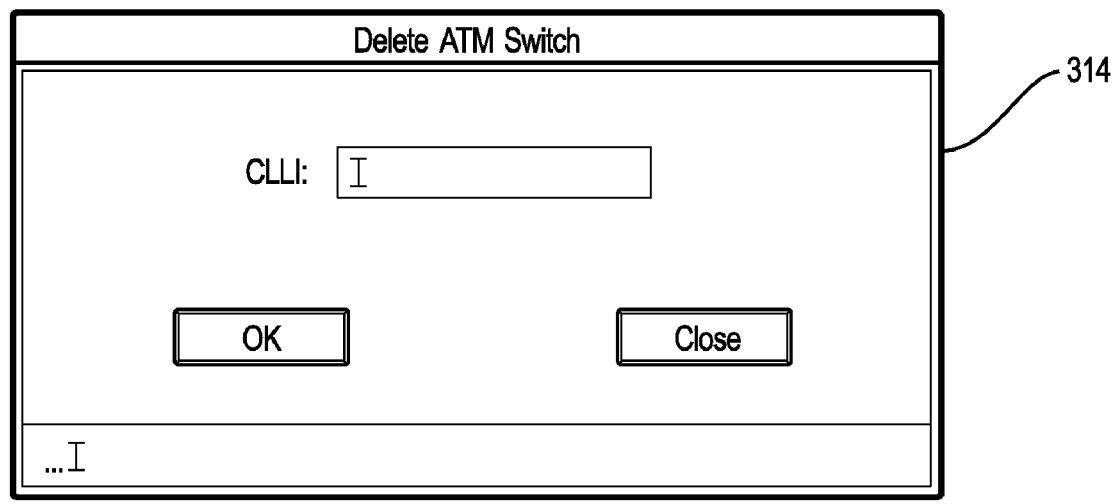

To delete an ATM switch, the NetworkCreation option leads to a drop-down menu that includes ATM, which should be selected, then the ATM Switch, and then the Delete ATM Switch. The Delete ATM Switch window 314 appears as illustrated in FIG. 7D. In the CLLI field, the CLLI code is entered, and the delete is committed to the database.

Figure 7E:
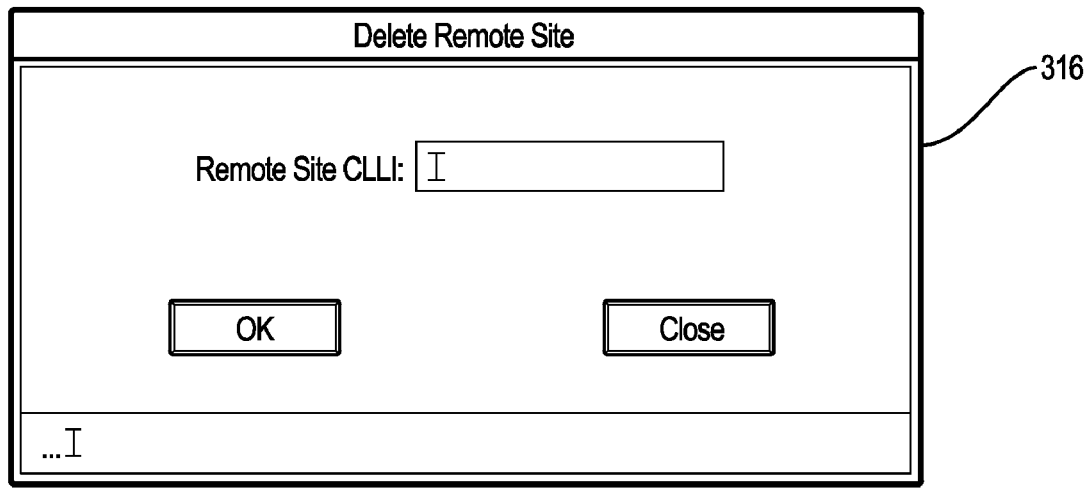

To delete a Remote Site, the NetworkCreation option leads to a drop-down menu that includes Remote Side, which should be selected, and then the Delete Remote Side. The Delete Remote Side window 316 appears as illustrated in FIG. 7E. In the CLLI field, the CLLI code is entered, and the delete is committed to the database.

Figure 7F:
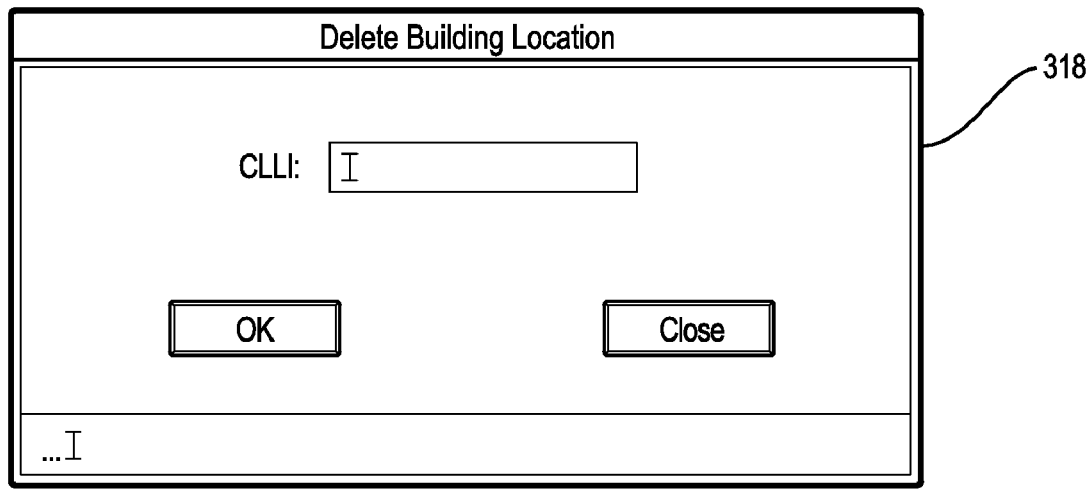

To delete a building location, the NetworkCreation option leads to a drop-down menu that includes Building Location, which should be selected, and then the Delete Building Location. The Delete Building Location window 318 appears as illustrated in FIG. 7F. In the CLLI field, the CLLI code is entered, and the delete is committed to the database. However, the location may not be deleted if the location has any DSLAM or ATM switch associated with the location; or if the location has any physical ports associated with it that are associated with physical links. Deleting a location also deletes the ATM physical port on the ATM network that is associated with the location. These ports have no associated physical links.

From the foregoing description of the exemplary embodiments of the present inventions and operations thereof, other embodiments will suggest themselves to those skilled in the art. Therefore, the scope of the present invention is to be limited only by the claims below and equivalents thereof.

We claim:

1. A network management system for modeling a path for a customer's services from a terminating unit through elements on a link-by-link basis, across networks, to a network service provider (NSP) or Internet service provider (ISP), the network management system comprising:
   a network creator for creating a topology including the elements and links in the networks, the topology including the respective features, functions, characteristics, and capacities of the elements and of the links;
   a service order receiver/mapper for receiving a service order from a customer for service provisioning of the customer from a terminating unit to a service provider of global communications services, and for mapping information from the service order onto the topology so as to create a permanent virtual circuit (PVC) from the terminating unit of the customer to the service provider of the global communications services;
   a fault manager for providing an alert indicator when a problem associated with at least one of the elements in the networks occurs; and
   an inventory manager for inventory and capacity management of digital subscriber line access multiplexer (DSLAM) ports of the networks.

2. The network management system of claim 1, wherein the alert indicator includes an interface illustrating an area where the at least one element is located and a representation of the at least one element, the representation of the at least one element changing to indicate a status of the at least one element.

3. The network management system of claim 2, wherein the fault manager provides an identification of a source of the alert indicator upon selection of the representation of the at least one element.

4. The network management system of claim 1, further comprising a diagnostic function for researching a port of the at least one element, for viewing how the customer is connected to the networks, and for determining whether the customer is affected by upstream actions.

5. The network management system of claim 1, further comprising a service manager for denying, restoring, or editing a service associated with the customer.

6. The network management system of claim 5, wherein the service manager is further for editing a record associated with the customer, deleting the service order, and modifying a profile associated with the customer.

7. The network management system of claim 1, further comprising a delete function for deleting elements in the networks, wherein interdependent elements in the networks are deleted in a sequence as follows: physical lines, a Mini-Ram, a digital subscriber line access multiplexer (DSLAM) switch, a remote site, and a location.

8. The network management system of claim 1, wherein creating a topology comprises creating the topology to include respective locations of the elements in the networks.

9. The network management system of claim 8 wherein the respective locations of the elements in the networks include a building location.

10. A method for modeling a path for a customer's services from a terminating unit through elements on a link-by-link basis, across networks, to a network service provider (NSP) or Internet service provider (ISP), the method comprising:
    creating a topology including the elements and links in the networks, the topology including the respective features, functions, characteristics, and capacities of the elements and of the links;
    receiving a service order from a customer for service provisioning of the customer from a terminating unit to a service provider of global communications services, and mapping information from the service order onto the topology so as to create a permanent virtual circuit (PVC) from the terminating unit of the customer to the service provider of the global communications services;
    providing an alert indicator when a problem associated with at least one of the elements in the networks occurs; and
    managing an inventory and a capacity of digital subscriber line access multiplexer (DSLAM) ports of the networks.

11. The method of claim 10, wherein the alert indicator includes an interface illustrating an area where the at least one element is located and a representation of the at least one element, the representation of the at least one element changing to indicate a status of the at least one element.

12. The method of claim 11, further comprising providing an identification of a source of the alert indicator upon selection of the representation of the at least one element.

13. The method of claim 10, further comprising researching a port of the at least one element, viewing how the customer is connected to the networks, and determining whether the customer is affected by upstream actions.

14. The method of claim 10, further comprising denying, restoring, or editing a service associated with the customer.

15. The method of claim 10, further comprising editing a record associated with the customer, deleting the service order, and modifying a profile associated with the customer.

16. The method of claim 10, further comprising deleting elements in the networks, wherein interdependent elements in the networks are deleted in a sequence as follows: physical lines, a Mini-Ram, a digital subscriber line access multiplexer (DSLAM) switch, a remote site, and a location.

17. The method of claim 10, wherein creating a topology comprises creating the topology to include respective locations of the elements in the networks.

18. The method of claim 17, wherein the respective locations of the elements in the networks include a building location.

* * * * *

UNITED STATES PATENT AND TRADEMARK OFFICE
CERTIFICATE OF CORRECTION

| | | |
|---|---|---|
| PATENT NO. | : 7,720,074 B2 | Page 1 of 1 |
| APPLICATION NO. | : 11/564095 | |
| DATED | : May 18, 2010 | |
| INVENTOR(S) | : Ward M. Chewning, III et al. | |

It is certified that error appears in the above-identified patent and that said Letters Patent is hereby corrected as shown below:

On the title page, in item [63] U.S. Application Data should read:

(63) Continuation of application No. 09/649,478, filed on ~~Aug. 2, 2000~~ Aug. 28, 2000, now Pat. No. 7,142,530.

Signed and Sealed this
Twenty-second Day of March, 2011

David J. Kappos
*Director of the United States Patent and Trademark Office*